(12) United States Patent
Puleri et al.

(10) Patent No.: US 10,212,611 B2
(45) Date of Patent: Feb. 19, 2019

(54) MULTIPOINT TRANSMISSION AND RECEPTION IN A RADIO COMMUNICATION NETWORK

(71) Applicant: Telefonaktiebolaget LM Ericsson (publ), Stockholm (SE)

(72) Inventors: Marzio Puleri, Pisa (IT); Antonella Bogoni, Pisa (IT); Antonio D'Errico, Pisa (IT); Francesco Laghezza, Pisa (IT); Paolo Ghelfi, Pisa (IT); Teresa Pepe, Pisa (IT); Filippo Scotti, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/554,460

(22) PCT Filed: Mar. 16, 2015

(86) PCT No.: PCT/EP2015/055465
§ 371 (c)(1),
(2) Date: Aug. 30, 2017

(87) PCT Pub. No.: WO2016/146163
PCT Pub. Date: Sep. 22, 2016

(65) Prior Publication Data
US 2018/0049041 A1 Feb. 15, 2018

(51) Int. Cl.
*H04W 40/00* (2009.01)
*H04M 1/00* (2006.01)
(Continued)

(52) U.S. Cl.
CPC ............ *H04W 16/28* (2013.01); *H04B 7/022* (2013.01); *H04B 7/0408* (2013.01);
(Continued)

(58) Field of Classification Search
CPC ... H04W 16/28; H04W 16/26; H04W 72/082; H04W 16/32; H04W 72/0473;
(Continued)

(56) References Cited

U.S. PATENT DOCUMENTS 4,125,836 A * 11/1978 Stavis .................... G01S 1/08
342/386
4,166,923 A 9/1979 Kobayashi et al.
(Continued)

FOREIGN PATENT DOCUMENTS

EP 0899868 A1 3/1999
EP 0998088 A2 5/2000
(Continued)

OTHER PUBLICATIONS

Irmer. R. et al., "Coordinated Multipoint: Concepts, Performance, and Field Trial Results", IMT-Advanced and Next-Generation Mobile Networks, Feb. 2011, pp. 102-111, IEEE Communications Magazine.
(Continued)

*Primary Examiner* — Rafael Pérez-Gutiérrez
*Assistant Examiner* — Mark G. Pannell
(74) *Attorney, Agent, or Firm* — Sage Patent Group

(57) ABSTRACT

A plurality of sub-cells are defined within a cell area of a radio communication network by the intersection of a radio paths of a plurality of directional radio antennas. The plurality of directional radio antennas are arranged to broadcast radio signals simultaneously, and to receive radio signals simultaneously. This disclosure relates to determining of signal values transmitted by or received from the plurality of directional radio antennas in a radio communication network.

7 Claims, 13 Drawing Sheets

(51) Int. Cl.

| | |
|---|---|
| *H04W 16/28* | (2009.01) |
| *H04B 7/022* | (2017.01) |
| *H04B 7/0408* | (2017.01) |
| *H04B 7/0495* | (2017.01) |
| *H04B 7/06* | (2006.01) |
| *H04B 7/08* | (2006.01) |
| *H04W 16/26* | (2009.01) |
| *H04W 72/08* | (2009.01) |
| *H04W 16/32* | (2009.01) |
| *H04W 72/04* | (2009.01) |

(52) U.S. Cl.
CPC ......... *H04B 7/0495* (2013.01); *H04B 7/0691* (2013.01); *H04B 7/086* (2013.01); *H04B 7/0874* (2013.01); *H04B 7/0897* (2013.01); *H04W 16/26* (2013.01); *H04W 72/082* (2013.01); *H04W 16/32* (2013.01); *H04W 72/046* (2013.01); *H04W 72/0446* (2013.01); *H04W 72/0473* (2013.01)

(58) Field of Classification Search
CPC ............ H04W 72/0446; H04W 72/046; H04B 7/0874; H04B 7/086; H04B 7/0691; H04B 7/0495; H04B 7/0897; H04B 7/022; H04B 7/0408
USPC .......................................................... 455/449
See application file for complete search history.

(56) References Cited

U.S. PATENT DOCUMENTS

| | | | |
|---|---|---|---|
| 5,450,044 A | 9/1995 | Hulick | |
| 8,031,116 B1* | 10/2011 | Lee | H01Q 3/36 342/372 |
| 2002/0193146 A1* | 12/2002 | Wallace | H04B 7/0417 455/562.1 |
| 2007/0293172 A1* | 12/2007 | Shi | H04B 7/0634 455/187.1 |
| 2010/0008445 A1* | 1/2010 | Khan | H04B 7/0613 375/296 |
| 2011/0267120 A1* | 11/2011 | Ravi | H03L 7/1978 327/159 |
| 2012/0002211 A1* | 1/2012 | Cho | G01J 3/02 356/451 |
| 2012/0206667 A1* | 8/2012 | Kroll | G03H 1/02 349/15 |
| 2012/0280794 A1* | 11/2012 | Parrault | H04L 25/4906 340/10.1 |
| 2013/0109400 A1* | 5/2013 | Liu | H04W 16/28 455/452.1 |
| 2013/0162459 A1 | 6/2013 | Aharony et al. | |
| 2014/0341048 A1* | 11/2014 | Sajadieh | H04L 5/0085 370/252 |
| 2015/0229032 A1* | 8/2015 | Liu | H01Q 15/23 343/766 |

FOREIGN PATENT DOCUMENTS

| | | |
|---|---|---|
| EP | 1154661 A2 | 11/2001 |
| WO | 0038388 A1 | 6/2000 |
| WO | 2011162663 A1 | 12/2011 |
| WO | 2014126569 A1 | 8/2014 |

OTHER PUBLICATIONS

Meikle, H., "Modern Radar Systems (Second Edition)", 2008, pp. 1-722, Artech House, Inc., Norwood, MA.

Yao, J., "Microwave Photonics", Journal of Lighwave Technology, Feb. 1, 2009, pp. 314-335, vol. 27, No. 3.

Khilo, A. et al., "Photonic ADC: overcoming the bottleneck of the electronic jitter", Optics Express, Feb. 13, 2012, pp. 4454-4469, vol. 20, No. 4.

Lin, I. et al., "Photonic Synthesis of Broadband Microwave Arbitrary Waveforms Applicable to Ultra-Wideband Communication", IEEE Microwave and Wireless Components Letters, Apr. 2005, pp. 226-228, vol. 15, No. 4.

Piqueras, M. et al., "High Performance Photonic ADC for Space and Defence Applications", IEEE International Conference on Microwaves, Communications, Antennas and Electronics Systems, Nov. 7-9, 2011, pp. 1-6.

Sun, J. et al., "Stable Dual-Wavelength DFB Fiber Laser With Separate Resonant Cavities and Its Application in Tunable Microwave Generation", IEEE Photonics Technology Letters, Dec. 15, 2006, pp. 2587-2589, vol. 18, No. 24.

Serafino, G. et al., "Stable Optically Generated RF Signals from a Fibre Mode-Locked Laser", 23rd Annual Meeting of the IEEE Photonics Society, Nov. 7-11, 2010, pp. 193-194.

Ghelfi, P. et al., "Novel Architecture for a Photonics-Assisted Radar Transceiver Based on a Single Mode-Locking Laser" IEEE Photonics Technology Letters, May 15, 2011, pp. 639-641, vol. 23, No. 10.

Walden, R., "Analog-to-Digital Converters and Associated IC Technologies", IEEE Compound Semiconductor Integrated Circuits Symposium, Oct. 12-15, 2008, pp. 1-2.

Ghelfi, P. et al., "Phase Coding of RF Pulses in Photonics-Aided Frequency-Agile Coherent Radar Systems", IEEE Journal of Quantum Electronics, Sep. 2012, pp. 1151-1157, vol. 48, No. 9.

Scheer, J., "Coherent Radar System Performance Estimation", IEEE International Radar Conference, May 7-10, 190, pp. 125-128.

Capmany, J. et al., "Microwave photonics combines two worlds", Nature Photonics, Jun. 2007, pp. 319-330, vol. 1.

Ghelfi, P. et al., "Photonic generation and independent steering of multiple RF signals for software defined radars", Optics Express, Sep. 23, 2013, pp. 22905-22910, vol. 21, No. 19.

Goldberg, L. et al., "Microwave Signal Generation with Injection-Locked Laser Diodes", Electronics Letters, Jun. 23, 1983, pp. 491-493, vol. 19, No. 13.

Goldberg, L. et al., "Generation and control of microwave signals by optical techniques", IEEE Proceedings J—Optoectronics, Aug. 1992, pp. 288-295, vol. 139, No. 4.

Chi, H. et al., "An Approach to Photonic Generation of High-Frequency Phase-Coded RF Pulses", IEEE Photonics Technology Letters, May 15, 2007, pp. 768-770, vol. 19, No. 10.

Khan, M. et al, "Ultrabroad-bandwidth arbitrary radiofrequency waveform generation with a silicon photonic chip-based spectral shaper", Nature Photonics, Jan. 17, 2010, pp. 117-122, vol. 4.

Elbornsson, J. et al., "Blind Equalization of Time Errors in a Time-Interleaved ADC System", IEEE Transactions on Signal Processing, Apr. 2005, pp. 1413-1424, vol. 53, No. 4.

Williamson, R. et al., "Effects of Crosstalk in Demultiplexers for Photonic Analog-to-Digital Converters", Journal of Lighwave Technology, Feb. 2001, pp. 230-236, vol. 19, No. 2.

Yilmaz, T. et al., "Toward a Photonic Arbitrary Waveform Generator Using a Modelocked External Cavity Semiconductor Laser", IEEE Photonics Technology Letters, Nov. 2002, pp. 1608-1610, vol. 14, No. 11.

Laghezza, F. et al., "Jitter-Limited Photonic Analog-to-Digital Converter with 7 Effective Bits for Wideband Radar Applications", IEEE Radar Conference, Apr. 29-May 3, 2013, pp. 1-5.

Ghelfi, P. et al., "A fully photonics-based coherent radar system", Nature Letter, Mar. 20, 2014, pp. 341-345, vol. 507.

Li, Z. et al., "Photonic Generation of Phase-Coded Microwave Signal With Large Frequency Tunability", IEEE Photonics Technology Letters, Jun. 1, 2011, pp. 712-714, vol. 23, No. 11.

Haykin, S., "Cognitive Radar [A way of the future]", IEEE Signal Processing Magazine, Jan. 2006, pp. 30-40.

* cited by examiner

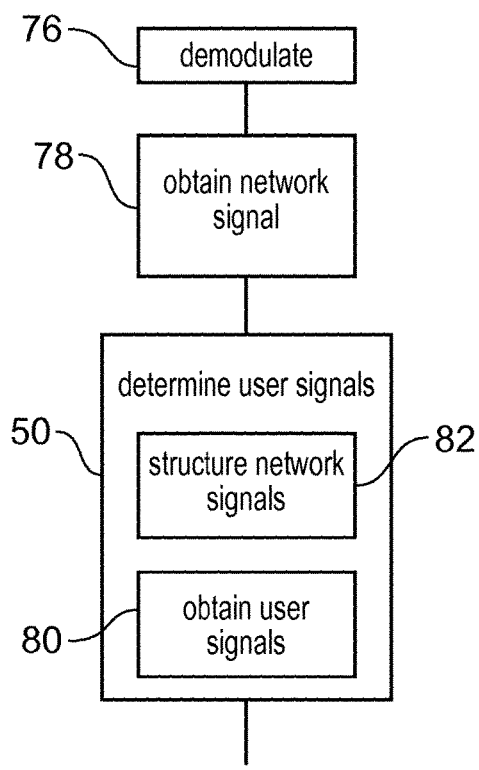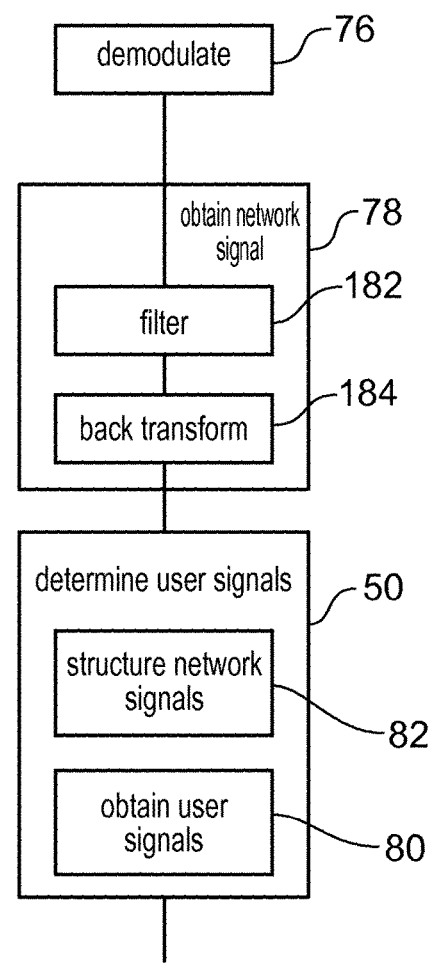
FIG. 11a
FIG. 11b

FIG. 12a

|   |   |   | Σx |
|---|---|---|----|
| 1 | 3 | 2 | 6  |
| 1 | 1 | 3 | 5  |
| 2 | 1 | 2 | 5  |

|   |   |   | Σx |
|---|---|---|----|
| ? | ? | ? | 6  |
| ? | ? | ? | 5  |
| ? | ? | ? | 5  |

|     |     |     | Σx |
|-----|-----|-----|----|
| 6/3 | 6/3 | 6/3 | 6  |
| 5/3 | 5/3 | 5/3 | 5  |
| 5/3 | 5/3 | 5/3 | 5  |

|     |     |     | Σx |
|-----|-----|-----|----|
| 6/3 | 6/3 | 6/3 | 6  |
| 5/3 | 5/3 | 5/3 | 5  |
| 5/3 | 5/3 | 5/3 | 5  |

|      |      |      | Σx   |
|------|------|------|------|
| 1.5  | 1.88 | 2.63 | 6.01 |
| 1.25 | 1.57 | 2.19 | 5.01 |
| 1.25 | 1.57 | 2.19 | 5.01 |

| 4 | 5 | 6 |
|---|---|---|
| 4 | 5 | 6 |
| 4 | 5 | 6 |

12

| 4   | 3.6 | 6   |
|-----|-----|-----|
| 5.3 | 5   | 4.4 |
| 4   | 6.6 | 6   |

| 1.8 | 1.6 | 2.6 |
|-----|-----|-----|
| 5.4 | 5.1 | 4.5 |
| 5.8 | 9.5 | 8.6 |

| 1.8 | 1.4 | 2.9 |
|-----|-----|-----|
| 4.6 | 5.6 | 4.5 |
| 6.4 | 9.5 | 8.6 |

| 1.7 | 1.3 | 3.3 |
|-----|-----|-----|
| 4.3 | 5.1 | 5.1 |
| 6.0 | 8.6 | 9.7 |

| 1.5 | 1.6 | 3.3 |
|-----|-----|-----|
| 4   | 4.6 | 6.4 |
| 6   | 8   | 8.8 |

| 1.4 | 1.5 | 3   |
|-----|-----|-----|
| 4   | 4.6 | 6.4 |
| 6.3 | 8.4 | 9.3 |

| 1.4 | 1.6 | 3.2 |
|-----|-----|-----|
| 4.3 | 5.6 | 6   |
| 6.8 | 7.9 | 9.3 |

MULTIPOINT TRANSMISSION AND RECEPTION IN A RADIO COMMUNICATION NETWORK

TECHNICAL FIELD

This disclosure relates to multipoint transmission and reception in a communication network. The disclosure is particularly applicable to the determining of signal values transmitted by or received by a plurality of directional radio antennas in a radio communication network.

BACKGROUND

A significant growth in traffic volume in future radio communication networks is expected.

It is envisaged that that the number of users in future radio communication systems will increase, owing to an increase in the number of subscribers and the emergence of new types of devices and the new services requiring a connection to a communication network. Many devices that are not currently connected to a communication network, for example traffic lights, vehicles, medical devices, waste bins and electricity supply systems, may be connected to a communication network in the future. The large-scale introduction of communicating machines will go hand in hand with the emergence of many new use cases and applications. Applications relating to the control of critical infrastructures (such as electrical grids), industrial control or vital societal functions, such as traffic, e-health and smart-city management are also envisaged. This connectivity will bring significant benefits to people, business and society, but will increase the number of devices that a radio communication network is required to support.

At the same time, it is expected that the data requirements of users will increase, both individually and collectively. It is envisaged that radio access with "unlimited" performance in which data, and the delivery of service, should be accessible instantaneously for both private and professional users, such as firefighters and paramedics. Consumer data rates of hundreds of Mbps should be generally available as a step toward realizing an unlimited access to information. Mobile-broadband services such as video streaming, data sharing and cloud services will remain, and will continue to drive a demand for higher consumer data rates.

Particular problems may occur in areas such as office spaces or dense urban outdoor environments, in order to support applications such as synchronization of local storage devices to cloud drives, streaming of ultra-high-resolution video, and virtual and augmented reality, especially for a high density of users.

Moreover, the cost of deploying, operating and maintaining a network, as well as the cost of the devices, should also be at a level that enables popular services to be provided at an attractive price for users, while maintaining attractive business cases for network operators. Energy efficiency is an important issue, in order to achieve and retain a low network-operation cost even with the expected massive increase in traffic.

There is a need to address a large number of technological challenges to meet the requirements of future radio communication systems and provide an efficient, high-performing solution for all users.

In future communication networks, it has been suggested that adjacent cells may operate using the same frequencies. Reusing frequencies in cells provides the highest network efficiency and enables high data rates close to the base station. However, re-use of frequencies in particular with a frequency reuse of 1 in which frequencies are reused in all cells, requires inter-cell interference to be addressed, in particular when the user equipment (UE) is located between two cells.

Coordinated MultiPoint (CoMP) techniques enable connections to several base stations to be made simultaneously, for example to enable data to be transmitted via least loaded base stations for better resource utilization. A user equipment receiving transmissions from multiple base stations using CoMP techniques may increase the overall received power at the handset using specialized combining techniques to utilize the interference between the received transmissions constructively. A user equipment at the edge of a cell can be served by two or more evolved Node Bs (eNBs) to improve signal reception and transmission and increase throughput, particularly at cell edges while reducing interference levels.

However, the use of CoMP techniques requires close dynamic coordination between a number of geographically separated eNBs in order to provide joint scheduling and transmission to a user equipment, as well as joint processing of the signals received from a user equipment.

Joint processing schemes for transmitting in the downlink place a high demand on the backhaul network, because the data to be transmitted to the user equipment needs to be sent to each eNB that will be transmitting the data to the user equipment. This leads to a significant increase in the amount of data in the network dependent upon how many eNBs will be sending the data. In addition to this, joint processing co-ordination data needs to be sent between all eNBs involved in the CoMP area.

Joint reception and processing are coordinated between the different eNBs in the uplink to take advantage of the forming of a virtual antenna array. The signals received by the eNBs are then combined and processed to produce the final output signal. Although this technique allows for signals that are very low in strength, or masked by interference in some areas, to be received with fewer errors, a large quantity of data needs to be transferred between the eNBs for it to operate.

Interference is a fundamental limiting factor in wireless cellular networks. While intra-cell interference may be mitigated by separating subscribers in orthogonal time, frequency or spatial dimensions, the mitigation of inter-cell interference is much more challenging. This is especially so for wireless networks where frequencies are reused aggressively and where hierarchical cellular structures such as pico-cells heavily overlap with macro-cell deployment.

Inter-cell interference can be actively exploited in a fully coordinated network multiple-input multiple-output (MIMO) system. The implementation of such a fully coordinated system, however, also requires high-capacity backhaul communication since data streams of multiple users must be shared among the multiple BSs to jointly transmit and receive signals for multiple mobile users Moreover the optimization of coordination across multiple cells presents a significant challenge since the presence of inter-cell interference leads to inherent non-convexity in the problem structure. The joint optimization of scheduling, beam forming and power allocation is a challenging problem mathematically. The use of scheduling, beam forming and power allocation across several cells for inter-cell interference mitigation has been considered in standardization efforts such as Long-Term Evolution (LTE) Advanced.

SUMMARY

According to a first aspect of the disclosure, there is provided a method for determining signals to be transmitted from a plurality of directional antennas in a radio communication network. The plurality of directional antennas are provided for a cell area and each directional antenna provides a directional radio path along which the directional antenna is configured to send and receive radio communications. The plurality of directional antennas are arranged such that directional radio paths overlap. The method comprises controlling the signals transmitted from the plurality of directional antennas to define a plurality of sub-cells within the cell area by an overlap of a plurality of directional radio paths. The directional antennas send radio communications to, and receive radio communications from, user equipment in the sub-cell. A subset of the plurality of directional radio paths intersect in the sub-cell and each directional antenna is associated with a set of sub-cells in which transmissions from the directional antenna are received.

An apparatus for determining signals to be transmitted in a radio communication network are also provided. In addition, a system comprising the apparatus and a plurality of transmitters is disclosed. Such a system may implement a base station of a radio communication network.

According to a second aspect of the disclosure there is provided a method operable to determine user signals in a radio communication network. In the radio communication network a plurality of directional antennas are provided for a cell area served by the plurality of directional antennas. Each of the directional antenna has a directional radio path along which the directional antenna can send and receive radio communications. The plurality of directional antennas are arranged such that their directional radio paths overlap to define a plurality of sub-cells within the cell area. User equipment in the sub-cell is able to send radio communications to, and receive radio communications from, a subset of the plurality of directional antenna whose directional radio paths intersect in the sub-cell such that each directional antenna is associated with a set of sub-cells and each sub-cell is associated with a plurality of directional antenna. The method comprises determining the user signal for a plurality of sub-cells associated with an antenna from a network signal for the antenna, the network signal comprising a user signal for each sub-cell of the plurality of sub-cells associated with the antenna.

An apparatus for determining user signals in a radio communication network is also provided. In addition, a system comprising the apparatus and a plurality of receivers is disclosed. Such a system may implement a base station of a radio communication network Embodiments of the disclosure enables the user density achievable in a radio communication network to be increased for the same number of radio equipment, or alternatively reduces the number of radio equipment required to cover the cell with the same user density, compared with conventional techniques.

The increase in user density can be achieved while simultaneously limiting the effects of interference between user equipment within the cell. The use of embodiments of the disclosure results in very low interference outside the served area in view of the defined radio transmissions.

A periodic phase modulation may be used in the radio communication signals. The periodic phase modulation has a period shorter than the transmission period. In one disclosed embodiment, the period of the phase modulations applied to each of the plurality of transmitted signals is different. In one disclosed embodiment the period of the phase modulations in received signals is the same.

The use of a periodic phase modulation enables signals from more than one source to be combined accurately.

Specific embodiments are described below, by way of example only, with reference to the accompanying drawings.

BRIEF DESCRIPTION OF THE DRAWINGS

FIG. 11a is a flow chart showing a method of determining signals in the uplink of a radio communication network in accordance with one embodiment.

FIG. 11b is a flow chart showing a method of determining signals in the uplink of a radio communication network in accordance with a different embodiment.

FIGS. 12a to 12e are data structures illustrating a determination of signals in the uplink of a radio communication network.

FIG. 13 shows data structures illustrating a further determination of signals in the uplink of a radio communication network.

DETAILED DESCRIPTION

Referring to FIGS. 1 to 7, the use of multiple transmission and reception techniques within radio communication networks is disclosed. Embodiments of the invention may be implemented in a network 1, for example the radio access network of a radio communication system.

Figure 1:
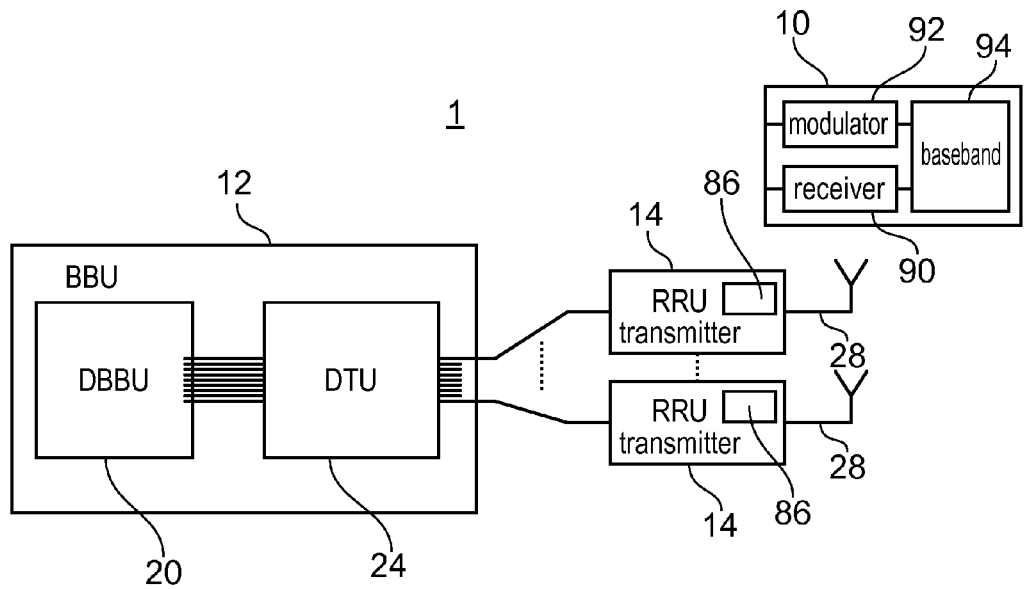
FIG. 1 is a block diagram showing network elements relating to downlink in a radio communication network.
Figure 2:
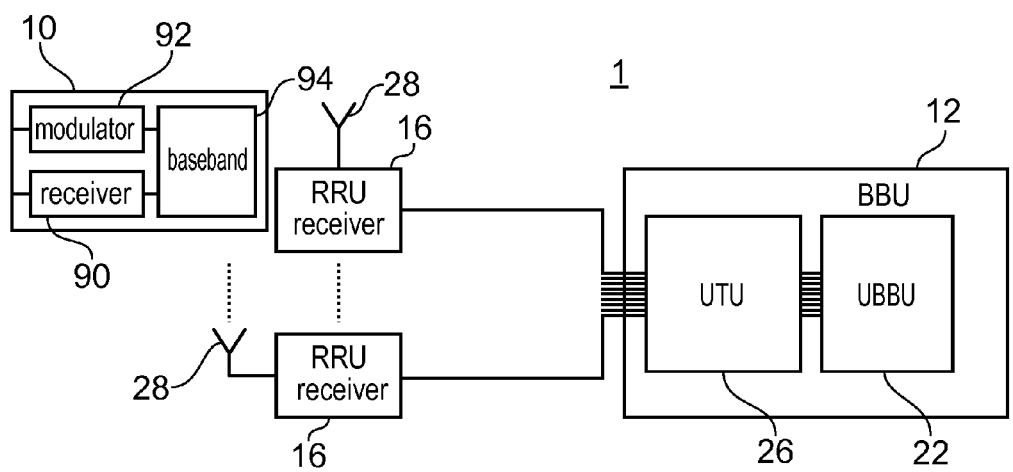
FIG. 2 is a block diagram showing network elements relating to uplink in a radio communication network.

Typically, the area to be covered by the network 1 is divided into a number of cell areas each defining a cell. A base station is provided for each cell to support a number of user equipment (UE) 10 within the cell area. Referring to FIGS. 1 and 2, a base station of the network is implemented as one or more Baseband Unit (BBU) 12, which might also be referred to as a Digital Unit (DU) or Main Unit (MU), and a plurality of Remote Radio Units (RRUs) each comprising a transmitter 14 and receiver 16 pair. A first RRU comprises RRU transmitter $14_1$, shown in FIG. 1, and RRU receiver $16_1$, shown in FIG. 2. A second RRU comprises RRU transmitter $14_2$ shown in FIG. 1 a RRU receiver $16_2$, as shown in FIG. 2. Although only two RRUs are shown in FIGS. 1 and 2, it will be appreciated by a skilled person that a different number of RRUs can be provided in other embodiments. In some examples, references to a RRU may alternatively refer to a base station, including baseband processing.

The BBU 12 is arranged to manage radio transmissions with a plurality of user equipment (UE) 10 in a cell associated with the BBU 12 by way of the RRUs. The BBU 12 is provided with a downlink baseband unit (DBBU) 20 (shown in FIG. 1) to handle downlink processing for user signals of UEs 10 in the cell. The BBU 12 is provided with an uplink baseband unit (UBBU) 22 (shown in FIG. 2) to handle uplink processing for user signals of UEs 10 in the cell.

The RRUs provide access to the network 1 for UEs 10 using radio access protocols suitable for the network by means of RRU transmitters 14 and RRU receivers 16. The RRU transmitters 14 transmit network signals across the radio access network to UEs 10 in the associated cell. The RRU receivers 16 receive network signals across the radio access network from UEs 10 in the associated cell.

A downlink transform unit (DTU) 24 and an uplink transform unit (UTU) 26 are provided. The DTU 24 and UTU 26 are shown separately for clarity, but may be combined.

The DTU 24 is arranged to receive, from the DBBU 20, a user signal in respect of a transmission period for each of a plurality of UE in the cell. The DTU 24 is arranged to supply a respective network signal for that transmission period to each of the RRU transmitters 14.

The UTU 26 is arranged to receive a network signal in respect of a transmission period for each of the RRU receivers 16. The UTU 26 is arranged to supply a respective user signal for each user for the transmission period to the UBBU 22.

As will be explained in more detail below, in embodiments of this disclosure, the network signals transmitted to UE 10 across the radio access network are not user signals for the UE 10 in the cell. Instead, the network signal transmitted by each of the RRU transmitters 14 is controlled for a number of users.

Equally in embodiments of the disclosure, network signals received across the radio access network are not user signals from a single user. Instead, the signals received by the RRU receivers 16 contain user signals from a number of UE 10 in the cell.

Each of the RRU is provided with a radio frequency antenna, for transmission of network signals to, and reception of network signals from, UEs 10 in the cell area. The antennas are directional radio antenna (DRA) 28.

Each DRA 28 has a radio path along which the DRA 28 can send and receive radio communications. The radio path therefore defines a portion of the cell area covered by the radio transmission from the DRA 28. The radio path is a directional radio path that extends in a specific direction. As a result, each DRA 28 is able to transmit radio frequency communications to, and is able to receive radio frequency communications from, UEs 10 only along or within a radio path extending in a specific direction from the DRA 28 instead of signals being broadcast to UE 10 in all directions, and signals being received from UE 10 in all directions. The radio path of the DRA 28 may be considered as a transmission lobe of the DRA 28, which extends only in a specified direction from the DRA 28.

Generally the DRA 28 are arranged and oriented within the cell area such that the radio paths of the DRA 28 cover the cell area from different angles. The angle between the directions of the radio paths of the plurality of DRA 28 may fall within the range 0° and 359°, in step of q degrees, in some embodiments. The accuracy of the techniques described in this disclosure benefits both from an increase in the number of DRA 28 used to cover the cell area, and also from an increase in the number of different angles covered by the radio paths of the DRA 28.

The radio paths of the DRA 28 overlap to define a plurality of sub-cells 30 within the cell area. Each sub-cell 30 occurs at an intersection of the radio paths of two or more DRA 28. A UE 10 in each sub-cell 30 is able to send radio communications to, and receive radio communications from, only those DRA 28 whose radio paths intersect in the sub-cell 30.

As will be explained in more detail with reference to FIGS. 3 to 5, the creation of sub-cells within a cell in disclosed embodiments is accomplished using the intersection of radio paths from the DRA 28, and the resulting overlapping of the radio transmissions from the DRAs 28.

Figure 3:
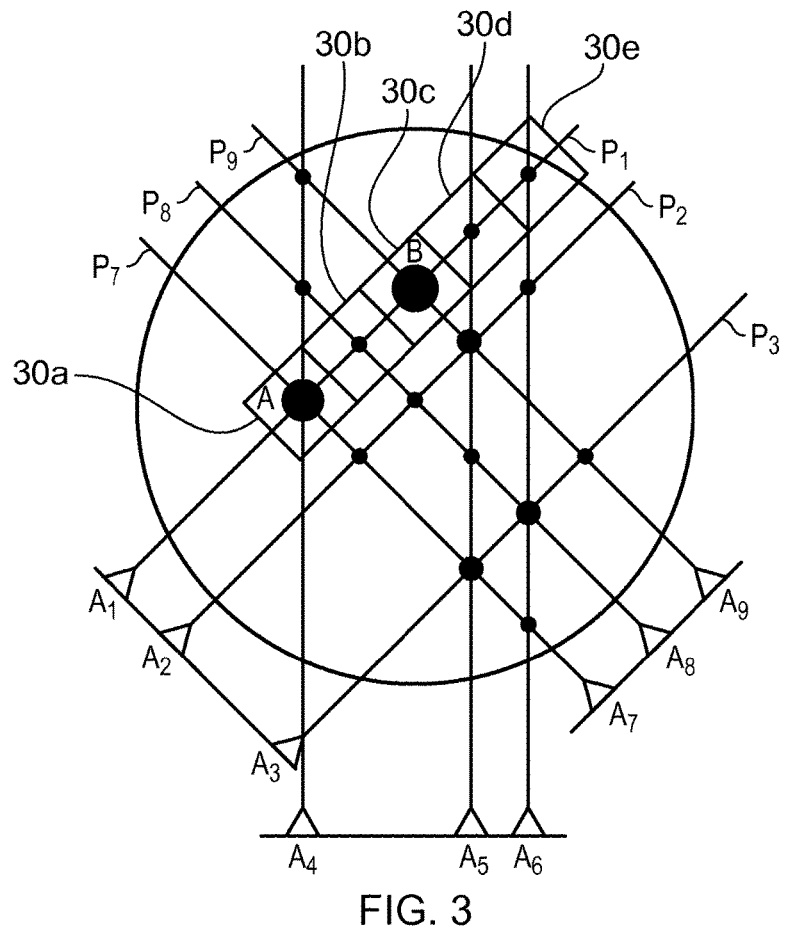
FIG. 3 is a diagram showing overlap of radio paths of directional antennas.
Figure 4:
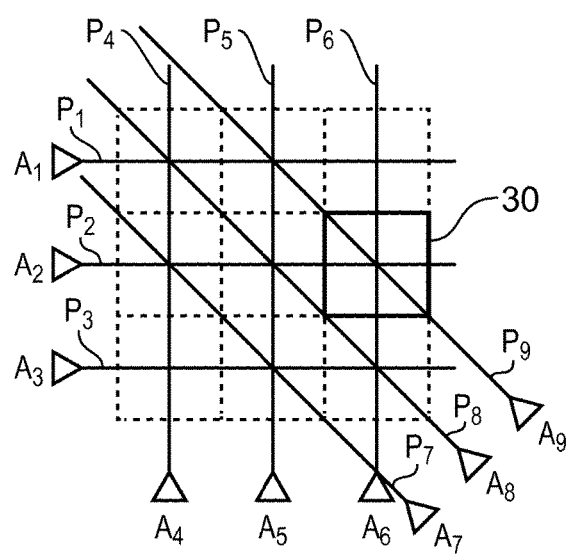
FIG. 4 is a diagram showing sub-cells defined by the overlap of radio paths of directional antennas.

A portion of a cell area is shown in FIGS. 3 and 4. In FIGS. 3 and 4 a plurality of DRAs 28, namely antennas A1 to A9, are provided for the portion of cell area. Each of the antennas A1 to A9 has a respective radio path P1 to P9. The radio paths are directional radio paths, as described above.

The antennas A1 to A9 are arranged and oriented within the cell area so that their radio paths P1 to P9 overlap. In FIG. 3, three relative angles of orientation of the directional radio paths of the antennas A1 to A9 are shown, namely: 0°, 45° and 90°. In FIG. 4, DRAs 28 are provided in each orientation of the radio paths, and the cell area is divided in $N^2$ sub-areas. The radio paths P1 to P9 intersect within the cell area to define a plurality of sub-cells 30.

From the above description, it is clear that a UE 10 in a sub-cell 30 is able to exchange radio communications only with the DRA 28 whose radio paths overlap in the sub-cell. As a result, each of the sub-cells 30 is associated with a set of DRAs 28, and with each DRA 28 within the set, For example, in the portion of the cell area shown in FIG. 3, a UE 10 located within sub-cell at position A is able to exchange radio communications with DRA A1, A4, and A7. The sub-cell at position A is therefore associated with a set of DRA 28 {A1; A4; A7}, and with each of the DRA 28 in the set.

Equally, it is clear that a DRA 28 is able to exchange radio communications only with a UE 10 in those sub-cells along the radio path of the DRA 28. As a result, each of the DRA 28 is associated with a set of sub-cells, and with each sub-cell 30 within the set. In the portion of the cell area shown in FIG. 3, antenna A1 is able to exchange radio communications along radio path P1 with UEs 10 in each of the sub-cells 30a, 30b, 30c, 30d, 30e. Antenna A1 is therefore associated with the set of sub-cells {30a; 30b; 30c; 30d; 30e}, and with each sub-cell of the set.

In some examples, apparatus is operable to determine signals to be transmitted from a plurality of directional antennas in a radio communication network, in which radio communication network a plurality of directional antenna are provided for a cell area served by the plurality of directional antennas. Each directional antenna having a directional radio path along which the directional antenna can send and receive radio communications. The plurality of directional antenna being arranged such that their directional radio paths overlap to define a plurality of sub-cells within the cell area, such that user equipment in the sub-cell is able to send radio communications to, and receive radio communications from, a subset of the plurality of directional antenna whose directional radio paths intersect in the sub-cell, such that each directional antenna is associated with a set of sub-cells in which transmissions from the directional antenna can be received. The apparatus is configured to control the signals transmitted from the plurality of directional antennas for each of the associated sub-cells.

Examples provide a method for determining signals to be transmitted from a plurality of directional antennas in a radio communication network. The plurality of directional antennas are provided for a cell area and each directional antenna provides a directional radio path along which the directional antenna is configured to send and receive radio communications, wherein the plurality of directional antennas are arranged such that directional radio paths overlap. Examples of the method comprise controlling the signals transmitted from the plurality of directional antennas to define a plurality of sub-cells within the cell area by an overlap of a plurality of directional radio paths. In some aspects, the directional antennas send radio communications to, and receive radio communications from, user equipment in the sub-cell. In some aspects, a subset of the plurality of directional radio paths intersect in the sub-cell and each directional antenna is associated with a set of sub-cells in which transmissions from the directional antenna are received. In some examples, any described aspect is not essential, and any combination of features, example or aspects may be used to define the disclosure. Any aspect of the disclosure may be combined with any other aspect or example of the disclosure. A related method may provide for transmission (and/or reception) of signals to (from) a sub-cell, using the determined signals.

Figure 5:
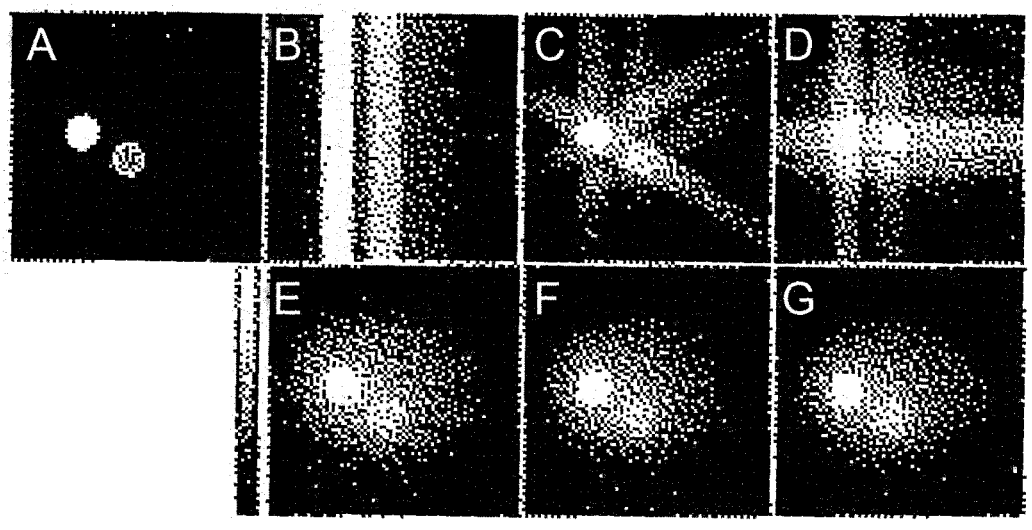
FIG. 5 illustrate the overlapping effect of radio paths from directional antennas.

FIG. 5 illustrates how transmissions from DRA 28 having overlapping radio paths can combine to form a radio field in an area. Picture A represents a desired radio field. Pictures B to G show the intensities of the radio field obtained by overlapping radio signals from DRA 28 with radio paths in different directions that intersect. Pictures B to G show the radio field achievable when using radio field contributions from: 1; 3; 4; 16; 32; 64 antennas, respectively. The white areas indicate the size and shape of a sub-cell. As is apparent, the difference between the target radio field and the radio field achievable by fields from different numbers of antennas is reduced as the number of DRA 28 used to create radio field is increased. Thus, as the number of antennas is increased, a more accurately defined sub-cell is defined. Such a sub-cell can be better distinguished from an adjacent sub-cell as the number of antennas increases.

From this, it may be appreciated how the combination of radio signals sent by a number of DRA 28 having directional radio paths that intersect results in a radio signal field varying throughout the cell area. At a sub-cell 30 position within the cell area, defined by the intersection of respective radio paths of DRA 28 associated with the sub-cell 30, the radio signal field results from a combination of the signals transmitted by each DRA 28. A UE 10 in the sub-cell 30 will therefore receive a radio signal that is the combination of the network radio signals transmitted by the associated DRA 28.

It will be apparent that the uplink situation is analogous to the downlink situation discussed above. A UE 10 in each cell broadcasts its respective user signal. Each DRA 28 receives a radio signal that can be considered to be a combination of the user signals transmitted by UE 10 in sub-cells associated with the DRA 28.

In some examples, transmission and reception follow complementary procedures. In transmission the input is provided by the shape of the field to generate. The field is projected to the area borders to get the projection value to be transmitted by each radio. Once the projected data are available radios are coordinated to transmit their signal at the same time so to create a stable field in the area as soon as the signal spread in the entire area. UEs are synchronized in order to know the time periods when they can sample the received signals. Synchronization can be achieved using features already available for that task in wireless communications.

UEs scheduled to transmit at a certain time slot towards radio stations placed at the borders of the area send their signal in any direction during a slot period. Only one UE per sub-area can transmit on a certain channel during each timeslot. As soon as the signal is stabilized in the whole area, the radio receivers sample the radio signal at their location. The signal received by each radio is the overlap of signals coming from the different UEs present in the area and represents the projection of the field in the direction subtended by its antenna. Once signals are sampled, they are processed using tomographic back-projection algorithms to reconstruct the value associated to each sub-area. The symbols transmitted by each UE during a timeslot are then recreated.

Figure 6:
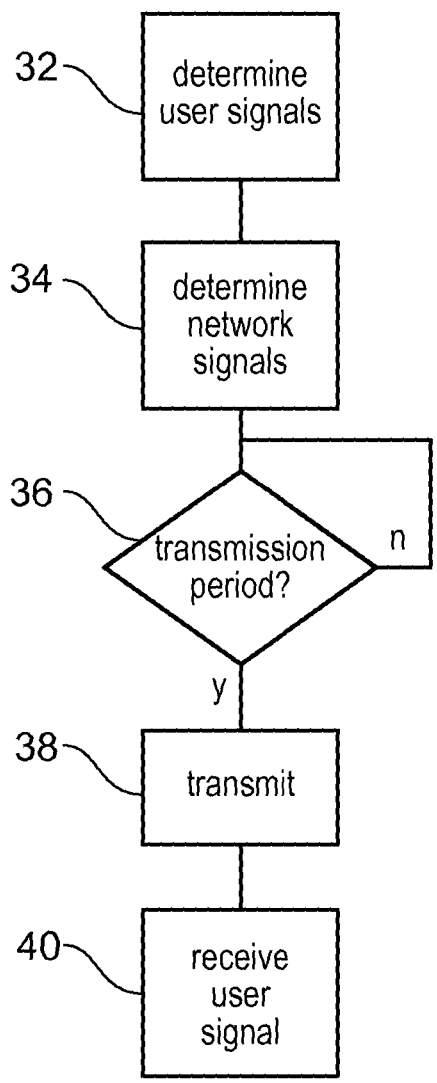
FIG. 6 is a flow chart showing a method in the downlink of a radio communication network in accordance with one embodiment.

Referring to FIG. 6, a method for the downlink of a radio communication network as described above with reference to FIGS. 1 to 4 is disclosed.

In step 32, a user signal for a UE 10 in each of a plurality of sub-cells 30 in a radio communication network are determined. The DBBU 20 carries out this step.

In step 34, a network signal determining the antenna signal to be transmitted by each RRU transmitters 14 using a respective DRA 28 is determined. In some aspects, the antenna signal is determined. The signals transmitted from the DRA 28 are controlled for each of the associated sub-cells 30, as will be explained in more detail in the following description. This step is carried out by the DTU 24.

In step 36, the start of a period for transmission of the network signals is determined in the RRU transmitter 14.

In step 38, during the period for transmission, each RRU transmitter 14 transmits from its DRA 28 the signal determined for the RRU transmitter 14 by the DTU 24 in step 34.

In step 40, once the radio field from the RRU transmitters 14 is stabilized in the sub-cell 30 during the transmission period, the UE 10 in each sub-cell detects the radio signal to obtain the user signal for that UE 10 for the transmission period. The radio field is generated by the overlap of transmissions from associated DRA.

Figure 7:
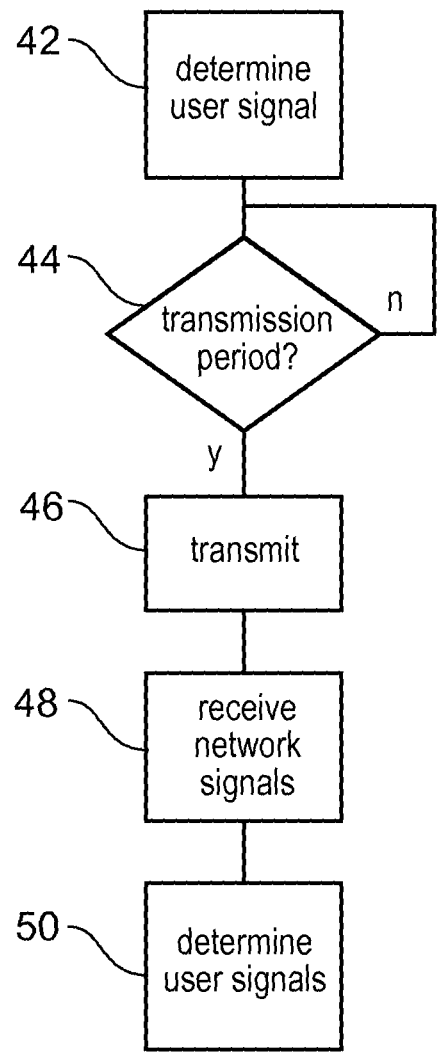
FIG. 7 is a flow chart showing a method in the uplink of a radio communication network in accordance with one embodiment.

Referring to FIG. 7, a method in the uplink of a radio communication network is disclosed.

In step 42, a UE 10 in each of the sub-cells of the radio communication network determines a user signal for a transmission period.

In step 44, the start of the transmission period for transmitting a user signal is determined by the UE 10.

In step 46, during the period for transmission, each UE 10 transmits its respective user signal, as determined in step 42.

In step 48, once the radio field from the transmitting UE 10 is stabilized during the transmission period, the radio network signal received at the DRA associated with each RRU receiver 14 is detected. As described above, the radio signals transmitted by a plurality of UE 10 overlap at the DRA 28. The radio signal at each DRA 28 represents a combination of the radio signals transmitted by the UE 10 in respective sub-cells associated with the DRA 28. The DRA 28 can sample the radio field to detect a received radio signal that includes a user signal contribution from UE 10 in each of the sub-cells associated with the DRA 28.

In step 50, the user signals are determined from the network radio signals received by the DRA 28 at the RRU receivers 14. The user signals transmitted by the user equipment are determined from the received antenna signal. This step is carried out in the UTU 26.

Typically although the radio signal received at a DRA 28 of a RRU receiver 16 comprises signal components from more than one UE, the received radio signal must be processed in order to obtain a network signal that represents a true combination or sum of the user signals received from different users.

Thus in more detail, step 50 typically involves the processing of the radio signals received at the antenna to obtain a network signal that represents a true combination or sum of the signals received from different sources. The user signals can be obtained from the network signals from the RRU receivers 16.

In one disclosed embodiment, this further processing of the received radio signal is carried out in the RRU receiver 16 associated with the receiving DRA 28. In one disclosed embodiment, this further processing of the radio signal is carried out in the UTU 26.

These methods enable communication with one UE 10 per sub-cell 30 simultaneously in a single transmission period. As illustrated with regard to FIG. 5, the use of further DRA 28 within the cell area will create additional sub-cells, thus increasing the capacity of the network.

Figure 8:
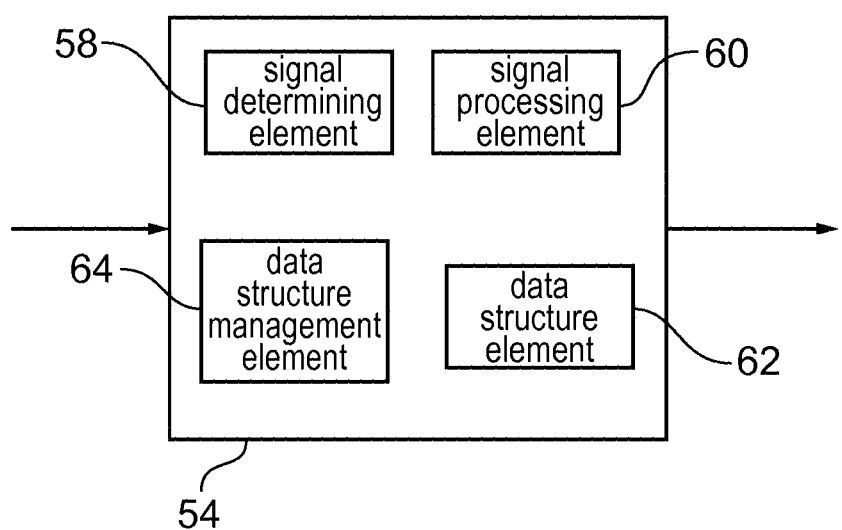
FIG. 8 is a block diagram of an apparatus in accordance with an embodiment.

Referring to FIG. 8, a transform unit (TU) 54 suitable for implementing the DTU 24 and UTU 26 either together, or separately, is disclosed. The TU 54 receives input signals, determines new signals from the input signals, and outputs the new signals as output signals.

When the TU 54 operates as the DTU 24, the input signals of the TU 54 are user signals. The TU 54 operates according to step 34 of FIG. 6 to generate network radio signals for the plurality of RRU transmitters 14. The network radio signals control the radio signal transmitted by the respective DRA 28 of the RRU transmitter 14.

When the TU 54 operates as the UTU 24, the input signals of the TU 54 are network signals from the DRA 28 of the RRU receiver. The TU 54 operates according to step 50 of FIG. 7 to generate user signals for the plurality of UE 10 in the cell.

Generally, elements of the BBU 12, RRU transmitters 14, RRU receivers 16 or UEs 10 may be implemented in hardware, for example using a dedicated processing arrangement. In some embodiments, other elements are embodied in software elements containing instructions executable by a processor stored in a memory, suitable to cause a processor to perform the described method or operation of that element.

In the disclosed embodiment, TU 54 is implemented as a signal determining element (SDE) 58, whereby the TU 54 is operative to determine network radio signals to be transmitted from the DRA 28 of the RRU transmitters 14, and/or is operative to determine user signals from a network signal from the respective DRA 28 of a plurality of RRU receivers 16.

In one disclosed embodiment, the TU 54 is provided with a signal processing element (SPE) 60 operative to process the received radio signal at the DRA to obtain respective network signals, as will be explained in more detail later.

The operation of the TU 54 to generate network signals in the downlink or to generate user signals in the uplink can be carried out in alternative ways, as will be understood. One feature of the methods of the disclosed embodiments is the association between a DRA 28 and the sub-cells associated with the DRA 28; and the association between a sub-cell 30 and the DRAs 28 associated with the sub-cell 30. These associations enable a transformation between one set of signals, for example user signals in sub-cells, and another set of signals, for example signals network signals for a DRA 28, to be made with relative ease.

In disclosed embodiments, the TU 54 is provided with a data structure element (DSE) 62, which is arranged to store user signals or network signals. The DSE 62 typically defines sub-cell elements and DRA elements within a data structure, together with the relationship between the elements. The relationships between the sub-cell elements and DRA elements within a data structure embody the relationships or associations between the sub-cells 30 within the network and the DRA 28 within the network. Thus typically the data structure will define or provide a relationship or association between a sub-cell element and the element of all the DRA 28 that are associated with the respective sub-cells 30 in the network. In a corresponding manner, the data structure defines or provides a relationship or association between a DRA element and the sub-cell element of all the sub-cells that are associated with respective DRA in the network.

The TU 54 is provided with a data structure management element (DSME) 64 for populating the DSE 62 with signal values. In downlink operation, the sub-cell elements are populated with user signals by the DSME 64. The SDE 58 can access the DSE 62 to determine network signals corresponding to the DRA 28 elements. In uplink operation the DRA 28 elements are populated with network signals by the DSME 64. The SDE 58 can access the DSE 62 to determine user signals corresponding to the sub-cell elements.

In one embodiment, the DSE 62 is implemented as a multi dimensional array.

Figures 9, 10:
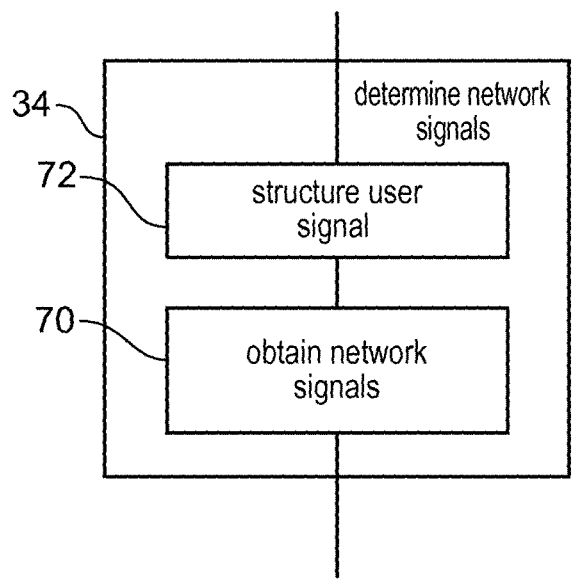
FIG. 9 is a flow chart showing a method of determining signals in the downlink of a radio communication network in accordance with one embodiment.
FIG. 10 is a data structure illustrating the determination of signals in the downlink of a radio communication network.

Referring to FIGS. 9 and 10, a more detailed method is disclosed for the step of determining network signals, as discussed with regard to step 34 of FIG. 6, in accordance with one embodiment.

In a step 70 of the method, the network signals for the transmission period are obtained from the user signals for the period. This step is carried out in some embodiments by transforming a set of user signals into a set of corresponding network signals. In some aspects, references to network signals may be considered as references to antenna signals.

In this situation, a set of network signals, for the radio signal to be transmitted from each of the DRAs 28, are to be found such that in each sub-cell 30 the sum of the radio signals transmitted by DRA 28 associated with that cell will sum to the required user values. An alternative way of looking at the problem is to consider how the user values associated with each sub-cell 30 can be distributed between, or projected onto, the transmitted antenna values. In some aspects, this analysis (e.g. by the DTU, and which may be referred to as tomographic analysis or projection) is based on transmissions from a plurality of directional antennas, each transmitting to a plurality of UEs (each UE in a different sub-cell). By correlating or comparing the signal between a plurality of antennas, a signal for/from a particular sub-cell can be determined. This is the case even when a particular directional antenna is simultaneously transmitting to (or receiving signals from) a plurality of UEs. In some aspects, coordination with one or more other directional antennas forming one of the plurality of sub-cells allows a signal for a particular UE to be determined.

In the disclosed embodiment, an initial step 72 is carried out, in which the user signal data is first structured in some way that enables transformation of user signals into network signals possible. This may be achieved using the DSE 62 in the disclosed embodiments.

An example of one data structure is 3×3 element array disclosed in FIG. 10.

Each of the elements in the 3×3 array is a sub-cell element for a sub-cell 30 of the network. Each element is populated with a user signal for that sub-cell.

The unknown edge values x1, x2, x3, y1, y2, y3 are DRA elements, and represent the required network signals that must be determined. In this network, each of the sub-cells receives signal contributions from only two DRA 28.

For each sub-cell element, an equation can be established relating desired network signals x1, x2, x3, y1, y2, y3, with the user signals populating the cell.

This equation is of the form:

$$\text{user signal} = xi + yi:$$

where xi and yi represent network signals for the two antennas that are associated with the sub-cell 30.

In the middle sub-cell element of FIG. 10, we obtain an equation 1=x2+y2.

Equations can be obtained for all user values, and an n-equation system can be established containing an equation for each of the n sub-cell elements. The number of unknowns in the equation system will be the number m of DRA 28 for which network signals must be found, where m<n. In the exemplary array, m=6 and n=9.

An additional constraint deriving from physical aspects is that the network signal values must be greater than or equal to zero. This results in a constraint being imposed on the solution such that. xi>=0 and yi>=0.

Mathematical tools are known to solve such mathematical problems. For example, an operating research method like the simplex method may be used to obtain a solution.

The problem becomes to minimize some cost function z, with all network signal values being greater or equal to zero, for the equation system generated from the set of equations for each network signal. One example of a suitable cost function is z=sum(xi), which imposes a requirement that the sum of the amplitude values of the transmitters is minimized. This approach helps to reduce interference in the network.

In some examples, a subset of the plurality of directional antennas are used to define each sub-cell. For example, some, but not all, directional radio paths of a cell intersect to provide a sub-cell.

Referring to FIGS. 11*a* and 11*b*, FIGS. 12*a* to 12*e*, and FIG. 13, a more detailed method is disclosed for the step of determining user signals, as discussed with regard to step 50 of FIG. 7.

FIG. 11*a* and FIG. 11*b* are flow charts showing methods in the uplink of a radio communication network in accordance with disclosed embodiments. Steps have been given the same reference numerals where they relate to the same or similar steps.

Thus in more detail, determining the user signals in step 48 of FIG. 7 typically involves an initial step 76 of demodulating the radio signal received at each of the DRA 28 to obtain a demodulated signal. The received signal includes component received signals from more than one UE 10. This step is generally carried out in the RRU receivers 16.

In step 78 the demodulated signal is processed to obtain a network signal that represents a true combination or sum of the signals received from different sources. In the embodiment shown in FIG. 11*a*, the processing the demodulated signal is carried out in the RRU receiver 16. In the embodiment shown in FIG. 11*b*, the processing of the demodulated signal to obtain a network signal is carried out in by the SPE 60 the TU 54.

Thereafter a step of determining the user signals is carried out.

Referring to FIGS. 11*a* and 11*b*, a more detailed method is disclosed for the step of determining the user signals for the transmission period, as discussed with regard to step 50 of FIG. 7.

In a step 80 of the method, the user signals for the transmission period are obtained from the network signals for the period. This step is carried out in some embodiments by transforming a set of network signals into a set of corresponding user signals.

In this situation, a set of user signals are found from the network signals such that the user signals from each sub-cell 30 associated with a DRA 28 sum to the network value for that DRA 28, for all DRA 28 in the network. An alternative way of looking at the problem is to consider how the network signals associated with each DRA 28 can be distributed between, or projected onto, the user signals from the sub-cells contributing to the received network antenna signals to result in the observed network signals measured at the DRA 28. In some aspects, the analysis of the received signals may be considered as tomography, for example, tomographic field forming. An analysis of the data from a plurality of received signals allows reconstruction of a particular signal.

In the disclosed embodiment, an initial step 82 is carried out in which the data is first structured in some way that enables transformation of network signals into user signals possible. This may be achieved using the DSE 62 in the disclosed embodiments.

An example of one data structure is 3×3 element array disclosed in FIGS. 12*a* to 12*e*.

Each of the elements in the 3×3 array is a sub-cell element for a sub-cell 30 of the network, and represents a user signal for the sub-cell. The edge values are DRA elements and represent the network signals. In this network, each of the sub-cells receives signal contributions from only two DRA 28.

Network signals can be applied to the array as the respective edge values. The user signals for sub-cell elements are to be determined.

The reconstruction of signals in each element can be viewed as the problem of solving a linear system of equations Ax=b. Several algebraic techniques exist to solve such problems. One such method is the Algebraic Reconstruction Techniques (ART), introduced by Gordon, Bender & Herman (1970) for solving the problem of three dimensional reconstruction from projections in electron microscopy and radiology.

In one example, an algebraic iterative reciprocal projection is carried out, in which a projection value is repeatedly distributed over the (partially) contributing elements, according to the sum of the values in the previous step.

In this case, the network signals are the projection values, and the contributing elements are user signals for the UE 10 in sub-cells that contribute to the network signal for each DRA. In this situation, the problem is to distribute the observed network signal for a DRA 28 to the UE 10 in sub-cells associated with the DRA 28, in order to determine the user signal for the UE 10 in each sub-cell 30.

Since each sub-cell 30 is associated with several DRA 28, and each DRA 28 is associated with several sub-cells 30, this process must be applied iteratively.

One example of the procedure is described below showing the reconstruction process on a 3×3 array, using one projection in x and y directions respectively.

FIG. 12*a* is shown for information only, to show the actual user signals, which give rise to the observed network signals.

FIG. 12*b* represents the problem to be solved of obtaining the unknown user signals from the observed network signals.

FIG. 12*c* shows the values of the user signal elements after an initial step carried out on each row. In this initial step, it is assumed that the user signals of the sub-cell elements contribute equally to the observed network signals. Thus a value representing the network signal, divided by the number of elements in the row, is projected from the DRA element, containing a respective network signal, to the unknown user signals in the associated sub-cell elements. In the case of the first row of the array shown in FIG. 12*c*, we project a value of 6/3 to each element of the row. Since this is an initial step, all the values of a row are identical.

FIG. 12*d* shows the antenna array after an initial back projection for a column has been applied, using a similar method.

FIG. 12*e* shows the values in the antenna array after an additional projection step is carried out. For the projection step, a new user signal for a sub-cell element is calculated by applying the formula:

$$X_{n+1} = N \cdot X_n / (\text{sum of } X_n)$$

where $X_{n+1}$ is a new value for the sub-cell element representing a user signal N is is the current projection value (i.e. antenna signal value)

$X_n$ is the existing value of the sub-cell element representing a user signal

Sum of $X_n$ is the sum of the existing user signals in sub-cell elements in the row or column In this way, the projection value is distributed repeatedly across elements contributing to the projection value. The process may be repeated for rows and columns each representing an antenna of the network until the values converge.

FIG. 13 shows another worked example, where three projections at: 0°, 45° and 90° are used. The techniques described above may be applied to FIG. 13 in the same way.

Referring to FIGS. 14-22*c*, methods and apparatus implementing embodiments of the invention will now be described. In the radio communication network disclosed in these embodiments, data is transmitted across the radio access network using symbols. Symbols are encoded using one or more symbol values to modulate one or more modulation parameters of a radio frequency carrier during a respective symbol period.

A modulation parameter of the radio communication carrier is any feature of the carrier that can be modulated to carry information, such as the amplitude and/or phase of the carrier, or the amplitude of a carrier component, such as an in-phase(I) carrier component or a quadrature (Q) carrier component.

For example, the amplitude of a carrier may be modulated with a symbol value that represents or encodes a symbol to be transmitted. L-Level Amplitude Shift Keying (L-ASK) modulation is one example of an amplitude modulation scheme typically used in radio communication networks to transmit symbols. In another example, an I carrier component and a Q component may be modulated with respective symbol values that encode a symbol to be transmitted. Quadrature Amplitude Modulation (QAM) modulation is one example of such a modulation scheme typically used in radio communication networks to transmit symbols.

In embodiments in which a single modulation parameter is modulated to encode a signal, such as in used in amplitude modulation, the methods as described above may be applied to symbol values for the single modulation parameter.

In embodiments in which more than one modulation parameter is modulated to encode a signal, such as used in IQ modulation, the methods as described above may be applied independently to symbol values for the each modulation parameter.

Thus, in these embodiments user signals are the symbol values encoding a symbol representing data of or for a UE 10 during a symbol period.

Antenna signals are the symbol values modulating modulation parameters of a radio frequency carrier for transmission over the radio access network air interface.

Network signals are the symbol values representing the symbol values at the DRA 28 that correspond to the sum of symbol values relating to UE 10 associated with the DRA 28. In the downlink, the network signals are applied as antenna signals to control transmission of signals from the DRA 28*s*. However, in the uplink it may be necessary to process the received radio signal to obtain a network signal representing a true sum of user signal components as the network signal.

Figure 14:
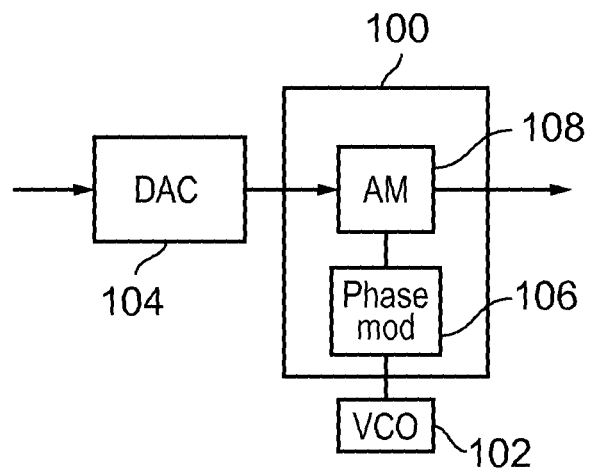
FIG. 14 is a block diagram showing a modulator in accordance with one embodiment.
Figure 17:
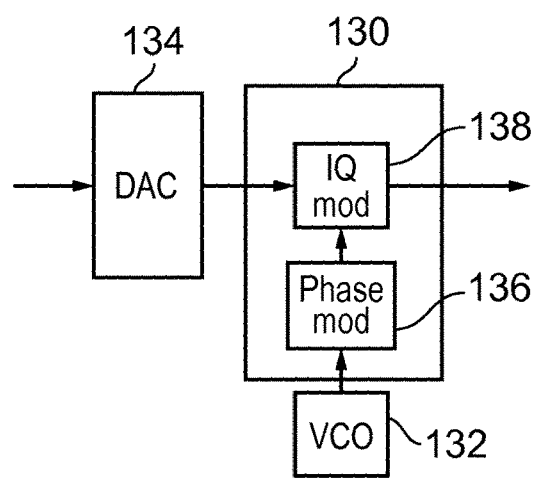
FIG. 17 is a block diagram of a modulator in accordance with one embodiment.

Referring to FIG. 1, each of the RRU transmitters 14 is provided with a RRU modulator 86 for modulating a radio frequency carrier with a respective antenna value. The RRU modulator 86 is coupled to a transmit DRA 28 for transmitting the modulated signal. In different embodiments RRU modulator 86 may be implemented as shown in FIG. 14 or 17. The RRU modulators 86 all use the same carrier frequency to transmit.

Each RRU receiver 16 is coupled to a respective DRA 28 to receive radio signals, as outlined above. The implementation of the RRU receiver 16 is described further with reference to FIGS. 15 and 20.

Figure 15:
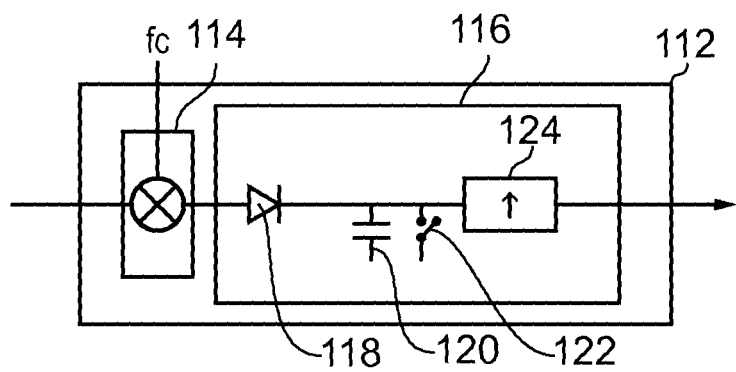
FIG. 15 is a block diagram of a receiver in accordance with one embodiment.
Figure 19:
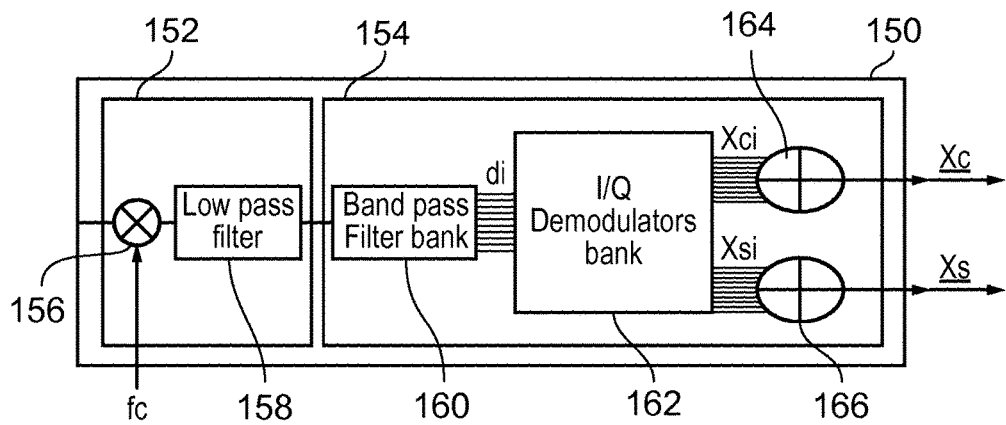
FIG. 19 is a block diagram of a receiver in user equipment in one embodiment.

Referring to FIGS. 1 and 2, the UE 10 has: a UE receiver 90, for receiving and processing radio signals from a number of DRA 28; a UE modulator 92, for modulating a radio frequency carrier for generating user signal; and UE baseband unit (UE BBU) 94, coupled to both the UE receiver 90 and the UE modulator 92. The UE modulator 92 may be implemented as shown in FIG. 14 or 17. The UE receiver 90 may be implemented as shown in FIG. 15 or 19. The UE modulators 92 all use the same carrier frequency to transmit.

In the disclosed embodiments, a source modulation comprising a periodic phase modulation is applied to the modulated signals sent over the air interface.

In the downlink, the use of a source modulation in the RRU transmitters 14 for DRA 28s associated with a sub-cell 30 means that a user signal that represents an accurate sum of the signals received at a UE 10 from different DRA 28 can be obtained from the radio signal received at the UE 10. The UE 10 therefore receives the intended user signal for the transmission period.

In the uplink, the use of a source modulation in the UE 10 in respective sub-cells associated with a DRA 28 means that a network signal that represents an accurate sum of the signals received at a DRA 28 from different UE 10 can be obtained from the received radio signal.

In more detail, the source modulation is applied by modulating the phase of the radio frequency carrier with a periodic phase modulation having a period shorter than the symbol period. The period of the periodic phase modulation may be an integer sub-multiple of the symbol period. This may be expressed mathematically as the period of the periodic phase modulation is equal to 1/kf, where 1/f is the symbol period and k is any integer greater than 1. In another embodiment k is any number greater than 1, and not necessarily an integer. In some embodiments, k used by one of the RRUs or UEs is a not multiple of k used by another of the RRUs or UEs. For example, k is a series of numbers including no multiples or having no common factors. In one embodiment, k is restricted to being a prime number (other than 1). In this case, the period of the periodic phase modulation is a prime number sub-multiple of the symbol period. This may be expressed mathematically as the period of the periodic phase modulation is equal to 1/kf, where 1/f is the symbol period and k is a prime number other than 1.

In yet other embodiments, k used by one of the RRUs is a multiple of k used by another of the RRUs, or k is a series of multiples.

The magnitude of the periodic phase modulation may increase or decrease over a period of the periodic phase modulation. The magnitude of the periodic phase modulation may change linearly over a period of the periodic phase modulation. The magnitude of the periodic phase modulation may have a saw-tooth wave-form.

The magnitude of the periodic phase modulation may change by 360 degrees within one period of the periodic phase modulation.

An embodiment of the invention will now be described with reference to FIGS. 14 to 16.

In this embodiment symbols are encoded for transmission across the air interface of the radio communication network in a symbol period using a symbol modulation comprising amplitude modulation. Specifically, the symbols are transmitted using L-level Amplitude Shift Keying (L-ASK).

In this embodiment, the periodic phase modulation has a period which is an integer sub-multiple of the symbol period. Different source modulations, relating to different periods of the periodic phase modulations, are used by different RRU modulators 86 or by different UE modulators 92. In the described embodiment, the period of each of the periodic phase modulation is equal to 1/kf, where 1/f is the symbol period and k is a prime number other than 1.

Figure 22A:
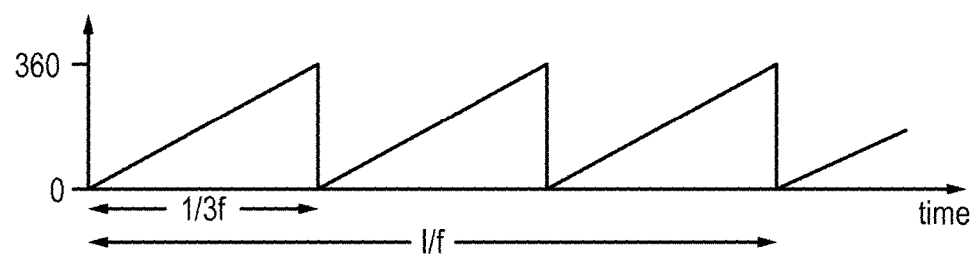
FIGS. 22a-22c show exemplary periodic phase modulation waveforms.
Figure 22B:
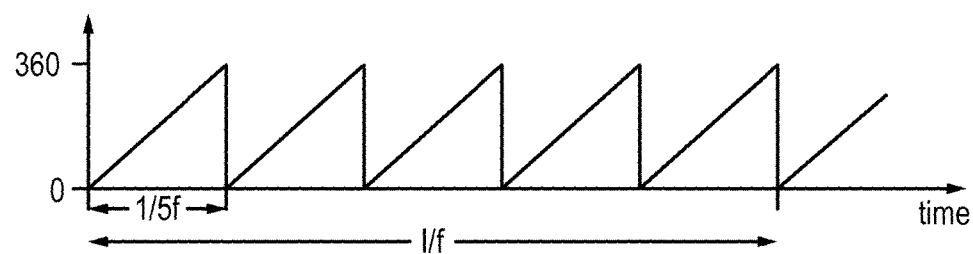

FIGS. 22a and 22b show periodic phase modulation waveforms that may be used in this embodiment.

In FIGS. 22a and 22b, the modulating wave forms increase linearly from a phase modulation magnitude of 0 degrees to a phase modulation magnitude of 360 degrees over one period of the periodic phase modulation. The symbol frequency is f, and so the symbol period is given by 1/f. As will be appreciated, this is equivalent to a linearly increasing phase modulation in which a whole number of cycles are completed in a symbol period.

FIG. 22a shows an exemplary periodic phase modulation waveform when k=3. The period of this waveform is ⅓f, and three periodic phase modulation cycles occur within one symbol period. FIG. 22b shows an exemplary periodic phase modulation waveform when k=5. The period of this waveform is ⅕f, and five periodic phase modulation cycles occur within one symbol period.

FIG. 14 is a block diagram showing an exemplary modulator 100. In one embodiment, this modulator 100 implements RRU modulator 86, in order to transmit symbol values corresponding to the network signal supplied by the DTU 24. In other embodiments, the modulator 100 implements UE modulator 92 in order to transmit symbol values corresponding to the user signal supplied by the UE BBU 94.

A source of a radio frequency carrier at a frequency suitable for communications within the radio communication network is provided. Specifically, in this embodiment, the source is a voltage controlled oscillator (VCO) 102.

A digital to analog convertor (DAC) 104 is provided and is arranged to receive the signals to be transmitted, in the form of symbol values to be transmitted The DAC 104 converts the symbol values from digital to analog symbol values. The analog symbol values are supplied from the DAC 104 to the modulator 100.

The modulator 100 is provided with a phase modulator 106 coupled to the voltage controlled oscillator 102 to receive the radio frequency carrier. The phase modulator 106 applies a source modulation by modulating the phase of the radio frequency carrier with a periodic phase modulation having a period that is shorter than the symbol period.

The modulator 100 has an amplitude modulator 108. The amplitude modulator 108 is arranged to receive the phase modulated radio frequency carrier from phase modulator 106 and the symbol values from the DAC 104. Amplitude modulator 19 modulates the amplitude of the radio frequency carrier according to the symbol values and outputs the modulated signal.

Thus, the modulator applies both a symbol modulation and a periodic phase modulation, in which the period of the periodic phase modulation is shorter than the symbol period.

Both the UE 10 and the RRU receivers 16 receive radio signals that include components or elements from more than one source. The use of different source modulations by the RRU modulators 86 and the UE modulators 92, respectively, enables the UE receiver 90 and the RRU receiver 16 to process signals received from a plurality of sources without error, to obtain a sum of the different components.

In the disclosed embodiment, source modulations applied by different simultaneous transmitters differ in the period of the periodic phase modulation applied as the source modulation. Each transmitted signal has the form:

$$A \cdot \cos(\omega t + \varphi_1(t));$$

where A is the amplitude of the transmitted signal, representing the symbol value element, and $\varphi_1(t)$=modulation $(N_i, f)$, representing the source modulation used by each transmitter. In this case, N is inversely related to the period of the periodic phase modulation, and is selected from the set of prime numbers $N_1=3$, $N_2=5$, $N_3=7$, $N_4=11$ etc.

When multiple sources transmit towards a receiver, the signals are detected with different phases because of the different fly times caused by differences in path length between the different transmitter and the receiver.

The signal received from 4 transmitters, for example, is thus of the form:

$$A_1 \cdot \cos(\omega t + \varphi_1(t) + \theta_1) + A_2 \cdot \cos(\omega t + \varphi_2(t) + \theta_2) + A_3 \cdot \cos(\omega t + \varphi_3(t) + \theta_3) + A_4 \cdot \cos(\omega t + \varphi_4(t) + \theta_4)$$

where:

$A_i$ is the amplitude of the received signal, representing the symbol value element;

$\Sigma_i A_i$ represents the symbol value encoding the symbol;

$\varphi_i(t)$=modulation $(N_i, f)$, representing the source modulation used by each transmitter, and in this case N is inversely related to the period of the periodic phase modulation, and is selected from the set of prime numbers $N_1=3$, $N_2=5$, $N_3=7$, $N_4=11$ etc.; and $\theta_n$ is the phase error caused by the different fly times The demodulation and processing of this signal is described with reference to FIG. 11a, which shows a method of determining signals received by a RRU receiver 16, and FIG. 15, which is a block diagram of a receiver 112.

In one embodiment, the receiver 112 implements the RRU receiver 16. In other embodiments, the receiver 112 implements UE receiver 90. The methods carried out in the RRU receiver 16 and in the UE receiver 90 are analogous.

Referring to FIG. 11a, in a first step 76 the received signal is demodulated.

In this embodiment, the received signal is demodulated by mixing the received signal with the radio frequency carrier and low pass filtering to form a demodulated signal comprising a number of different demodulated signal components.

The demodulated signal comprises a number of demodulated signal components, each of the form:

$$A_n \cdot \cos(\varphi_n(t) + \theta_n)$$

It will be understood that each of the demodulated signal components thus associates one or more symbol value element $A_n$ with a component frequency $\cos(\varphi_n(t) + \theta_n)$ related to the period of the periodic phase modulation $\varphi_n(t)$ of the respective modulated signal component.

The demodulated signal is the sum of the demodulated signals from each of the transmitters, and is of the form:

$$d(t) = A_1 \cdot \cos(\varphi_1(t) + \theta_1) + A_2 \cdot \cos(\varphi_2(t) + \theta_2) + A_3 \cdot \cos(\varphi_3(t) + \theta_3) + A_4 \cdot \cos(\varphi_4(t) + \theta_4)$$

Figure 16:
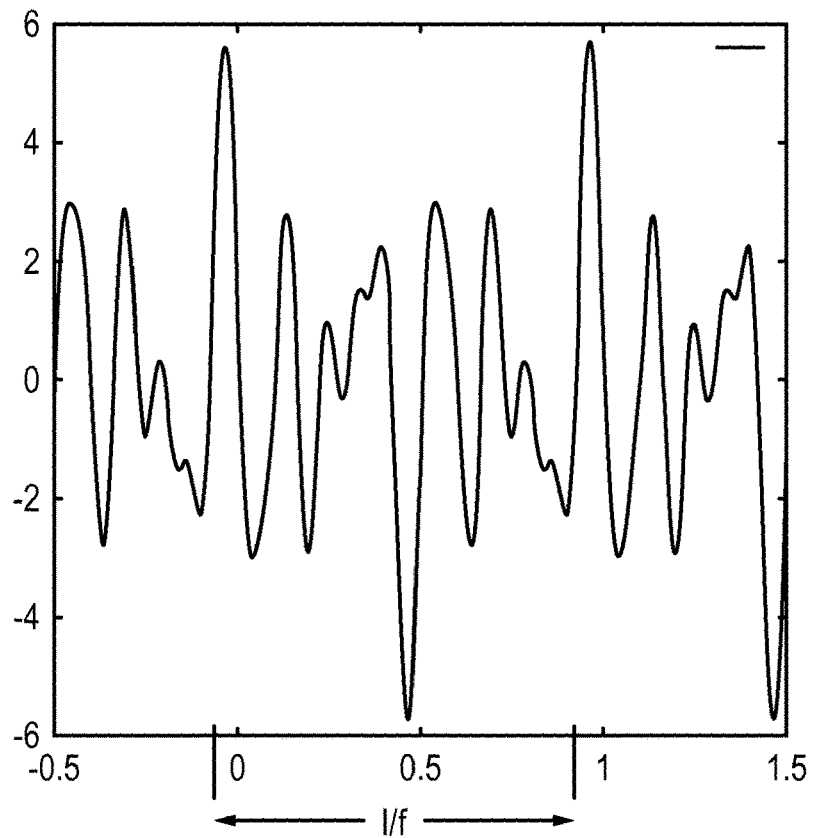
FIG. 16 is a diagram showing the waveform of an exemplary demodulated signal.

FIG. 16 is a diagram showing the waveform form of an exemplary demodulated signal.

In step 78, the demodulated signal is processed to obtain a network signal representing a true combination or sum of the signals received from different sources.

Interference between the demodulated signal components produces a periodic signal with frequency equal to the Least Common Denominator (LCD) of the component frequencies of the periodic phase modulations forming the source modulations. The LCD of the frequencies is f, which is the frequency of symbols. The demodulated waveform shown in FIG. 16 therefore has period identical to the symbol period, namely 1/f.

The use of periodic phase modulations with different frequencies related to the symbol period results in the phases of the demodulated signal components moving with respect to each other during a period. All combinations of phase values are covered within the period of the demodulated signal.

As a result, at one position within the period of the demodulated signal all demodulated signal components are in-phase. At this point, the amplitude of the demodulated signal is the sum of the amplitudes, or symbol value elements, associated with the respective component frequencies $\cos(\varphi_n(t) + \theta_n)$ of demodulated signal components.

The maximum amplitude of the demodulated signal in a symbol period is therefore detected. This represents the sum of amplitude symbol values from the different sources. This value, $\Sigma_i A_i$ represents the sum of the symbol components received.

The detection of the peak amplitude of the demodulated signal within the symbol period provides a mechanism to obtain a symbol value that represents a true combination of the received symbol amplitudes. This peak amplitude corresponds to the received user signal when the receiver 112 is implemented in the UE receiver 90. This peak amplitude corresponds to a network signal for the DRA when the receiver 112 is implemented in the RRU receiver 16.

FIG. 15 is a block diagram of an exemplary receiver 112 suitable for carrying out the above method.

The receiver 112 receives a modulated signal comprising a number of modulated signal components from different sources.

The receiver 112 has a demodulator 114 and a processing element 116.

The demodulator 114 carries out the demodulation of the received signal. In FIG. 15 the demodulator 114 is a simple mixer and filter arrangement that demodulates the received modulated signal using the radio frequency carrier.

The processing element 116 receives the demodulated signal from demodulator 114 and carries out the processing of the demodulated signal to obtain symbol values.

The processing element 116 is implemented as a peak detector. The peak value detector comprises a rectifying diode 118 coupled with a capacitor 120, a period sample switch 122 and a detection stage 124. The time reference for sampling the symbol can be reconstructed from the demodulated signal.

The peak detector detects a maximum amplitude of the demodulated signal over the symbol period. At the end of each period, the peak value is sampled and output from the processing element 116 as an amplitude symbol value. The amplitude symbol value therefore represents the sum of amplitude symbol values associated with the received signal.

An embodiment will now be described with reference to FIGS. 17 to 21. In this embodiment symbols are encoded for transmission across the air interface of the radio communication network by amplitude modulation of an in-phase and quadrature component of a radio frequency carrier.

In this embodiment, the periodic phase modulation used for the source modulation may have a period of any length shorter than the symbol period. In the downlink, different source modulations, relating to different periods of the periodic phase modulations, are used by different RRU modulators 86. In the uplink the same source modulation having the same period of the periodic phase modulations, is used by different UE modulators 92.

In the described arrangement, the magnitude of the periodic phase modulation changes by 360 degrees within one period of the periodic phase modulation. The magnitude of the phase modulation may change linearly over the period of the periodic phase modulation.

The waveforms shown in FIGS. 22a and 22b may be used in this embodiment.

Figure 22C:
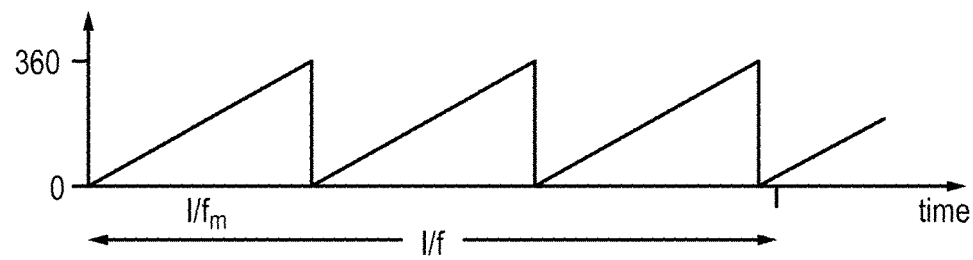

FIG. 22c shows a further type of periodic phase modulation waveform that can be used in this embodiment. The period of this waveform is $1/f_m$, where $f_m$ is the periodic phase modulation frequency or repetition rate. The period of this periodic phase modulation waveform is not an integral sub-multiple of the symbol period.

FIG. 17 is a block diagram of an exemplary modulator 130. In one embodiment, this modulator 130 implements the RRU modulator 86 in order to transmit symbol values corresponding to the network signal supplied by the DTU 24. In other embodiments, the modulator 130 additionally or alternatively implements UE modulator 92 in order to transmit symbol values corresponding to the user signal supplied by the UE BBU 94.

A source of a radio frequency carrier at a frequency suitable for communications within the radio communication network is provided. This source is a voltage controlled oscillator 132 in the embodiment shown in FIG. 17.

A digital to analog convertor (DAC) 134 is provided, arranged to receive the signals to be transmitted, in the form of symbol values to be transmitted. The DAC 134 converts the digital symbol values to analog symbol values to modulate an in-phase carrier component and a quadrature carrier component. The DAC 134 supplies an in-phase symbol value and a quadrature symbol value.

The modulator 130 is provided with a phase modulator 136. The phase modulator 136 is arranged to receive the radio frequency carrier from VCO 132, and modulates the phase of the radio frequency carrier in accordance with the periodic phase modulation as the source modulation.

The modulator 130 is provided with an IQ modulator 138. The IQ modulator 65 is coupled to the phase modulator 136 to receive the phase modulated carrier, and is coupled to the DAC 134 to receive an in-phase symbol value and a quadrature symbol value.

The IQ modulator 138 modulates the amplitude of the in-phase component and the quadrature component of the phase modulated carrier according to respective symbol values, and outputs the modulated radio frequency carriers as modulated signal.

The operation of the IQ modulator 138 to generate an in-phase carrier component and quadrature carrier component, and to modulate the amplitude of the in-phase carrier component and quadrature carrier component by the respective symbol value received from DAC 137 will be understood, and will not be explained in more detail.

When a modulator as described above is used as the RRU modulators 86, the UE receiver 90 of UE 10 in a sub-cell 30 will receive a signal made up of a plurality of modulated signal components from each associated DRA. Each modulated signal component is an IQ modulated signal at the carrier frequency. Each modulated signal also has a phase modulation caused by the source modulation applied by the transmitter, and a random phase contribution caused by the fly time.

The received signal can therefore be expressed mathematically by $$\sum_{i=1}^{N} x_{ci}\cos(\omega t + \varphi_i(t)) + \sum_{i=1}^{N} x_{si}\sin(\omega t + \varphi_i(t))$$

Where:
$x_{ci}$ is the in-phase symbol value, and
$x_{si}$ is the quadrature symbol value for a respective user For each modulated signal component, $\varphi_i(t)$ represents the phase contribution provided by the periodic phase modulation applied at the RRU modulator 86 as the source modulation together with a phase contribution due to the fly time.

With these assumptions, $\varphi_i(t)$ can be considered mathematically equivalent to $\omega t + \theta_i$ with $\omega_i$ being a frequency corresponding the period of the periodic phase modulation and $\theta_i$ the phase contribution due to the fly path.

Figure 18:
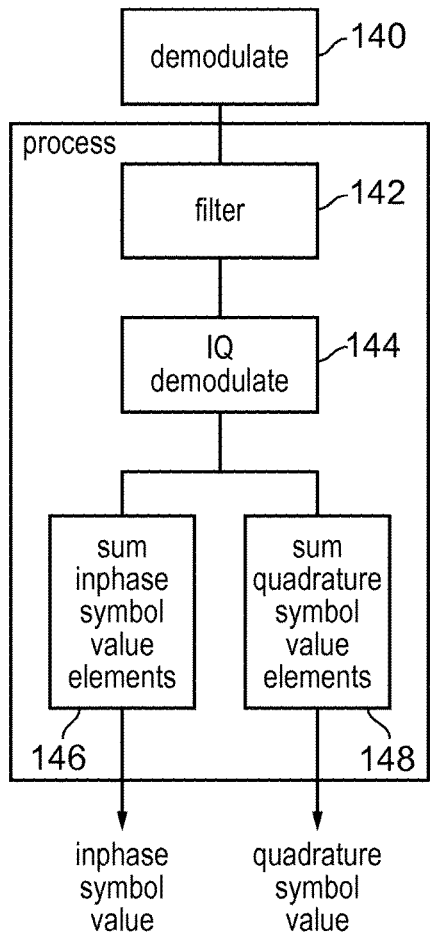
FIG. 18 is a flow chart showing a method carried out in user equipment.

The demodulation and processing of this signal in the UE receiver 90 is described with reference to FIGS. 18 and 19. FIG. 18 is a flow chart showing the method steps carried out by the UE receiver 90. FIG. 19 is a block diagram of an exemplary receiver in one embodiment.

Referring to FIG. 18, in a first step 140, the received signal is demodulated.

The received signal is first demodulated using the radio frequency carrier. Specifically, the received signal is demodulated by mixing with a signal $2 \cdot \cos(\omega t)$. The demodulated signal is then filtered removing high frequency components.

The resulting demodulated signal is $$\sum_{i=1}^{N} x_{ci}\cos(\varphi_i(t)) + \sum_{i=1}^{N} x_{si}\sin(\varphi_i(t)) = \sum_{i=1}^{N} x_{ci}\cos(\omega_i t + \theta_i) + \sum_{i=1}^{N} x_{si}\sin(\omega_i t + \theta_i)$$

This demodulated signal can be understood as a plurality of IQ demodulated signal components. Each demodulated signal component is at a respective component frequency $\varphi_i(t)$. As discussed above, $\varphi_i(t)$ is mathematically equivalent to $\omega_i t + \theta_i$ with $\omega_i$ being a frequency corresponding the period of the periodic phase modulation and $\theta_i$ the phase contribution due to the fly path.

The component frequency $\varphi_i(t)$ is related to the period of the periodic phase modulation of the respective modulated signal component. Each demodulated signal component thus associates in-phase and quadrature carrier component values, as symbol values, with the frequency $\varphi_i(t)$, as the component frequency.

The use of a periodic phase modulation as a source modulation has the effect of associating the respective symbol values with a component frequency of the demodulated signal component, after demodulation. The demodulated components from different sources therefore have different frequencies, and can be separated in the frequency domain after demodulation.

Thus, in a second step 142, the demodulated signal is filtered at a plurality of component frequencies to obtain a plurality of demodulated component signals. This filtering of the demodulated signal at the plurality of component frequencies separates the demodulated signal components received from different sources.

Each filtered demodulated component signal has the form $$d_i(t) = x_{ci}\cos(\omega_i t + \theta_i) + x_{si}\sin(\omega_i t + \theta_i)$$

and can be thought of as a simple IQ modulated signal.

The in-phase symbol value $x_{ci}$ and the quadrature symbol value $x_{si}$ for each of the filtered demodulated component signal can be obtained by a simple IQ demodulation of each of the component frequencies, for example by mixing the demodulated signal component with a respective reference signal extracted from each $d_i(t)$.

Therefore, in step 144, each of the plurality of demodulated signal components are processed to obtain a symbol value element for an in-phase component of the demodulated signal component, and a symbol value element for a quadrature component of the demodulated signal component.

The in-phase symbol value and quadrature symbol values for each of the demodulated signal are obtained. These values correspond to the in-phase symbol value $x_{ci}$ and the quadrature symbol value $x_{si}$ transmitted from each RRU transmitter 14

When this embodiment is employed in the downlink of a radio communication system, the symbol values received are combined at the UE to obtain the symbol values encoding the symbol to be transmitted to the UE during the symbol period as the user signal.

The the I/Q components $x_c$ and $x_s$ can be obtained by summing:

$$x_c = \sum_{i=1}^{N} x_{ci}$$

$$x_s = \sum_{i=1}^{N} x_{si}$$

In step 146 of the method shown in FIG. 18, the respective in-phase symbol value elements $x_{ci}$ for the plurality of demodulated components are summed to determine an in-phase symbol value for the symbol period.

In step 148 of the method shown in FIG. 18, the respective quadrature symbol value elements $x_s$ for the plurality of demodulated components are summed, to determine a quadrature symbol value for the symbol period.

Using this method, the UE 10 is able to correctly receive signal components or elements sent from more than DRA to obtain a user signal.

FIG. 19 is a block diagram of a UE receiver 150 that can be used to implement the UE receiver 90 in some embodiments.

The UE receiver 150 has a demodulator 152, coupled to receive a signal comprising a plurality of modulated signal components and to demodulate the received signal to obtain a demodulated signal comprising a plurality of demodulated signal components, and a processing element 154 for receiving and processing the demodulated signal.

The demodulator 152 comprises a mixer 156 and a low pass filter 158. The mixer mixes the received modulated signal with the carrier frequency 2·cos(ωt), to obtain a demodulated signal including demodulated components corresponding to each of the phase modulations of the signals received from each RRU. The low pass filter 158 removes unwanted high frequency components.

The processing element 154 comprises: a band pass filter bank 160; an IQ demodulator 162 and summing elements 164 and 166.

The band pass filter bank 160 is arranged to receive the demodulated signal from the demodulator 152 and provides a filter element 160 to filter the demodulated signal. The filter element 160 filters the demodulated signal at a plurality of component frequencies to obtain a plurality of demodulated signal components.

The band pass filter bank 160 comprises a plurality of band pass filters, each arranged to extract one of the demodulated signal component from the demodulated signal. Each band pass filter is arranged to filter a pass-band associated with a different component frequencies, to extract one of the demodulated signal components.

The IQ demodulator 162 is arranged to receive the plurality of demodulated signal components and to process them to generate respective in-phase symbol value Xci and quadrature phase symbol value Xsi for each source.

Summing element 164 provides an in-phase summing element and is arranged to receive the plurality of in-phase symbol value elements Xci for the plurality of demodulated components and to add them to determine a value Xc. This represents the in-phase symbol value for the UE 10 in that symbol period.

The in-phase symbol values Xci represent the respective in-phase symbol value element sent from a plurality of RRU for the UE 10 in the symbol period. These values can be combined without error to obtain a value Xc for the in-phase symbol value in the symbol period Summing element 166 provides and is arranged to receive the plurality of quadrature symbol value elements Xsi for the plurality of demodulated components and to add them to determine a value Xs. This represents the in-phase symbol value for the UE 10 in that symbol period The quadrature symbol values Xsi represent the respective quadrature symbol value element sent from a plurality of RRU for the UE 10 in the symbol value of the quadrature symbol value for the symbol period. These values can be combined without error to obtain a value Xs for the quadrature symbol value in the symbol period.

The in-phase symbol value Xc and quadrature symbol value Xs encode a received user signal for the symbol period. The use of the phase modulations by the RRU modulators 86 enables the symbol value elements for a symbol value to be transmitted to a UE 10 from different RRU transmitters 14 to be identified and combined, based on the source modulation associated with the symbol value elements, without destructive interference.

In the uplink, a UE modulator 92 may be implemented using modulator 130 shown in FIG. 17 to transmit a user signal. In this embodiment, the UE modulators 130 of all the UE use the same source modulation to generate a user signal containing a source modulation as described above with reference to FIG. 17.

Figure 20:
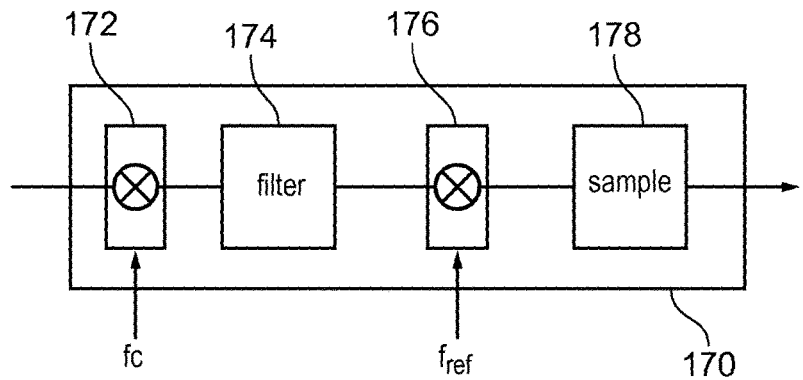
FIG. 20 is a block diagram of a receiver in accordance with one embodiment.

FIG. 20 shows elements of a RRU receiver 170 that can be used in implementing RRU receiver 16. As described above, each RRU receiver 170 receives a user signal from a UE in each cell of the sub-cells associated with DRA 28 of the RRU receiver 16.

The RRU receiver 170 therefore receives a signal at the associated DRA 28 that is of the form:

$$\sum_{i=1}^{N} x_{ci}\cos(\omega t + \varphi_i(t)) + \sum_{i=1}^{N} x_{si}\sin(\omega t + \varphi_i(t))$$

Where:
$x_{ci}$ is the in-phase symbol value, and
$x_{si}$ is the quadrature symbol value
for a respective user The term $\varphi_i(t)$ represents a combination of the phase modulation applied by the UE modulators, and the phase contribution due to the fly path. This can be expressed mathematically as:

$$\varphi_i(t) = \omega_\alpha t + \theta_i$$

where:
$\omega_\alpha$ is a frequency corresponding to the frequency of the phase modulation, used by all UEs 10, and
$\theta_i$ the phase contribution due to the fly path for a particular user.

With reference to the method shown in FIG. 11b, in step 76 the received signal is demodulated to obtain a base band signal. The demodulation is carried out by mixing the received signal with 2·cos(ωt) then low pass filtering to remove unwanted high frequency components.

The signal obtained is:

$$d(t) = \sum_{i=1}^{N} x_{ci}\cos(\varphi_i(t)) + \sum_{i=1}^{N} x_{si}\sin(\varphi_i(t)) =$$

$$\sum_{i=1}^{N} x_{ci}\cos(\omega_\alpha t + \theta_i) + \sum_{i=1}^{N} x_{si}\sin(\omega_\alpha t + \theta_i)$$

where i represents a specific UE 10, and $\theta_i$, is the phase contribution related to the sub-cell in which the user is located.

This signal represents the received radio antenna signal and contains user signals from UEs in sub-cells associated with the DRA 28. Thereafter the signal is sampled and then output for further digital processing.

The RRU receiver 170 is provided with a mixer 172 for receiving a radio frequency signal from the DRA 28 and a carrier signal having a frequency $f_c$. The mixer demodulates the received radio frequency signal to obtain a demodulated signal by mixing the received signal with the carrier.

The RRU receiver 170 is provided with a filter 174, arranged to receive and filter the demodulated signal to generate a filtered signal.

The RRU receiver 170 is provided with a further mixer 176, coupled to receive the filtered signal from filter 174. This signal is homodyned with a reference signal having a frequency $f_{ref}$, corresponding to the frequency of the phase modulation used by the UEs 10. For example, the reference signal may be sin $\omega_\alpha t$. The resulting signal is filtered to remove unwanted components (not shown in FIG. 20)

This results in a signal:

$$\sum_{i=1}^{N} x_{ci}\cos(\theta_i) + \sum_{i=1}^{N} x_{si}\sin(\theta_i)$$

A sample element 178 is arranged to receive the signal from the mixer 176 and to sample the signal at an appropriate sampling frequency. The resulting digital signal can be provided to the TU 54 for further processing.

In the disclosed embodiment, the SPE 60 of TU 54 is arranged to process the sampled signals from RRU receivers as set out below with reference to FIG. 11b. However, the described processing may be carried out in hardware and/or in another network element on other embodiments.

In the disclosed embodiments the mixing with the reference signal and sampling of the signal are carried out in each RRU receiver. However, these steps may be carried out elsewhere, for example in the TU 54, in other embodiments. This signal is processed as described below to determine the values of $x_{ci}$ and $x_{si}$ associated with each user.

The received signal can be considered to be the sum of the signals contributed by each user from a specific point in space relative to the DRA 28 that corresponds to the sub-cell 30. This is expressed as a radon transform of a function f (x, y). In this case the x and y co-ordinates refer to the spatial position of the sub-cells relative to the antenna. This position of each of the sub-cells relative to the antenna for a particular network can be determined from the intersection of the radio paths of the antennas, and is therefore known.

The description of the function f(x,y) relates to the situation where the function provides a single value at each point (x, y). For the current application an equivalent function relating to two variables, namely (I,Q) at each spatial position (x,y) is required. The principles discussed in the following description are easily applied to the two dimensional situation using an equivalent algebraic approach.

Mathematically, the radon transform off (x, y) is equivalent to a line integral of f (x, y) along a line inclined at an angle theta from the x axis and at a distance s from the origin, and can be expressed as:

$$g(s, \theta) = \Re f = \int\int_{-\infty}^{\infty} f(x, y)\delta(x\cos\theta + y\sin\theta - s)dxdy$$

Figure 21:
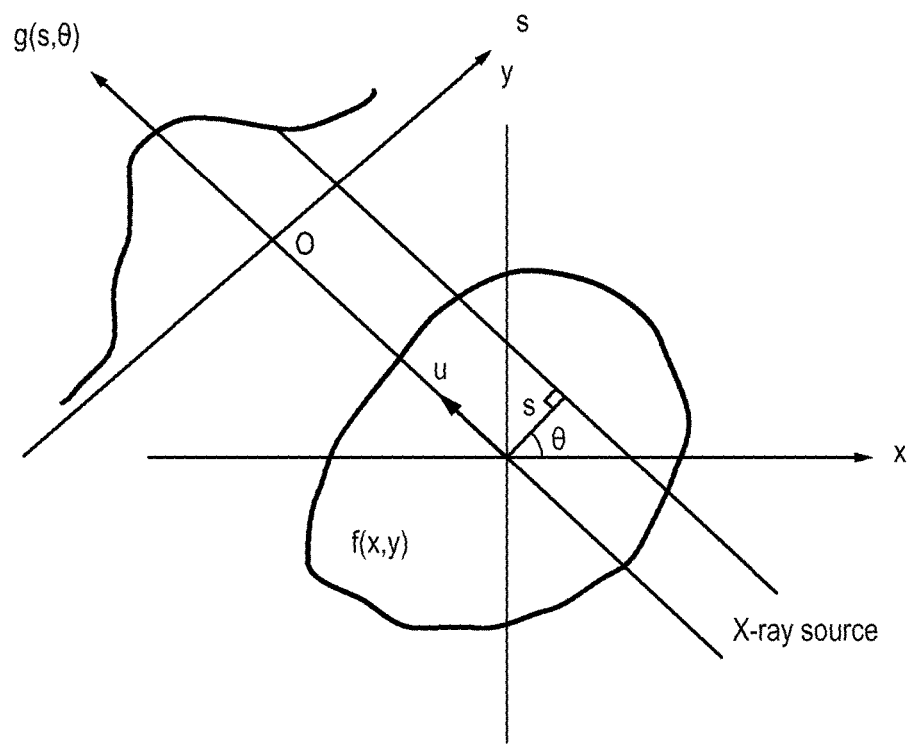
FIG. 21 is a schematic diagram illustrating a radon transformation.

FIG. 21 illustrates the calculation of the radon function.

In this case the x and y co-ordinates refer to the spatial position of the sub-cells relative to the antenna. This position of each of the sub-cells relative to the antenna for a particular network can be determined from the intersection of the radio paths of the antennas, and is therefore known.

The f(x, y) can be obtained from the received signal by filtering and applying a back projection operator, as explained below. This results in the generation of the function values (in this case (I,Q) at an array of spatial positions (x, y) of the sub-cells. The signal received by TU 54, obtained by mixing the demodulated received signal with the reference signal, is filtered in a filtering step 182. This filtering step is carried out prior to the further step of back-projection in order to ensure that the values obtained by correspond with the values obtained at the antenna.

This filter emphasizes the high-spatial frequencies. In practical applications filters designs used to reduce the effect of noise amplification, such as Ram-Lak, Shepp-Logan, low-pass cosine, generalized Hamming or stochastic filters, are suitable. A 1D filtering is applied in the disclosed embodiment. A 2D filtering operation may be applied in other embodiments.

In the disclosed embodiment a one dimensional filter with a |ξ| frequency response is used to implement the filtering step 182.

Thereafter, in step 184, the filtered signal is back projected.

Back projection involves the calculation of the sum of all paths passing through a point, and is evaluated by integrating the radon transform over theta for all paths passing through that point. In practice an algebraic algorithm may be used to perform the integration. Using an algebraic integration approach the I component values and the Q component values may be obtained directly at the spatial positions (x,y) corresponding with the positions of the sub-cells.

This can be expressed mathematically as:

$$b(x, y) = Bg = \int_0^\pi g(x\cos\theta + y\sin\theta)d\theta$$

In step 182, therefore, an integration operation is performed on the filtered signal with respect to the angle of incidence, in order to apply the back projection transformation described above to the filtered signal. This operation results in b(x, y), giving a value for I and Q components of the signal received at the antenna.

In this case x is $x_c$, and the application of the back transformation results in a value for the I component value being obtained as the sum of the in-phase symbol values $x_{ci}$, of the signals received at the DRA 28.

In this case y is $x_s$, and the application of the back transform results in a value for the Q component being obtained as the sum of the quadrature symbol values $x_{si}$ of the signals received at the DRA 28.

These I and Q component values correctly include all of the respective I and Q components from the received user signals, and therefore represent a network signal for the antenna. The effect of the processing of the received signals in steps 180-164 of FIG. 11*b* is therefore to generate a network signal that correctly includes all user signals received at the DRA 28.

The resulting network signal can be used in order to obtain user signals in accordance with step 50 of FIG. 11*b*.

In the disclosed embodiment, I component values obtained for each antenna separately are used in the methods described above to obtain an I component value for a user signal for each sub-cell. In the disclosed embodiment, Q component values obtained for each antenna separately are used in the methods described above to obtain an Q component value for a user signal for each sub-cell.

The user equipment may be any fixed or mobile device that is able to communicate using modulated radio frequency carriers with the radio communication network base station using an appropriate communication protocol.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present disclosure.

The invention claimed is:

1. A method for determining signals to be transmitted from a plurality of directional antennas in a radio communication network, wherein the plurality of directional antennas are provided for a cell area and each directional antenna provides a directional radio path along which the directional antenna is configured to send and receive radio communications, wherein the plurality of directional antennas are arranged such that directional radio paths overlap, the method comprising:
   determining signals to be transmitted from the plurality of directional antenna from user signals associated with respective ones of a plurality of sub-cells associated with each antenna;
   controlling the signals transmitted from the plurality of directional antennas in accordance with the determined signals and to define a plurality of sub-cells within the cell area by an overlap of a plurality of directional radio paths;
   wherein the directional antennas send radio communications to, and receive radio communications from, user equipment in the sub-cell;
   wherein a subset of the plurality of directional radio paths intersect in the sub-cell and each directional antenna is associated with a set of sub-cells in which transmissions from the directional antenna are received;
   at each antenna, transmitting the signal determined for that antenna during a transmission period; and
   applying a periodic phase modulation to the transmitted signal, the periodic phase modulation having a period shorter than the transmission period, wherein the period of the phase modulations applied to each of the plurality of transmitted signals is different.

2. The method of claim 1, further comprising determining a signal to be transmitted from one of the plurality of directional antennas associated with a plurality of sub-cells based on a signal to be transmitted from another antenna associated with at least one of the plurality of sub-cells.

3. The method of claim 1, further comprising:
   dividing a user signal for each of the sub-cells associated with the directional antenna into a plurality of user signal components; and
   allocating each user signal component to a respective antenna associated with the sub-cell.

4. The method of claim 3, wherein the user signals are symbol values encoding a symbol for the user in a symbol period.

5. The method of claim 1, wherein the magnitude of the or each periodic phase modulation applied in respect of a source modulation change by 360 degrees within one period of the periodic phase modulation.

6. The method of claim 1, wherein the or each periodic phase modulation applied in respect of a source modulation has a period which is an integer sub-multiple of the symbol period.

7. An apparatus for a radio communication network for determining signals to be transmitted from a plurality of directional antennas in a radio communication network, wherein the plurality of directional antennas are provided for a cell area and each directional antenna provides a directional radio path along which the directional antenna is configured to send and receive radio communications, wherein the plurality of directional antennas are arranged such that directional radio paths overlap, the apparatus comprising:
   processing circuitry;
   memory containing instructions executable by the processing circuitry whereby the apparatus is operative to:
   determine signals to be transmitted from the plurality of directional antenna from user signals associated with respective ones of a plurality of sub-cells associated with each antenna;
   control the signals transmitted from the plurality of directional antennas in accordance with the determined signals and to define a plurality of sub-cells within the cell area by an overlap of a plurality of directional radio paths;
   wherein the directional antennas send radio communications to, and receive radio communications from, user equipment in the sub-cell;
   wherein a subset of the plurality of directional radio paths intersect in the sub-cell and each directional antenna is associated with a set of sub-cells in which transmissions from the directional antenna are received;
   at each antenna, transmit the signal determined for that antenna during a transmission period; and apply a periodic phase modulation to the transmitted signal, the periodic phase modulation having a period shorter than the transmission period, wherein the period of the phase modulations applied to each of the plurality of transmitted signals is different.

* * * * *